United States Patent
Hatakeyama et al.

(10) Patent No.: US 9,960,703 B2
(45) Date of Patent: May 1, 2018

(54) DC POWER-SUPPLY DEVICE AND REFRIGERATION-CYCLE APPLICATION DEVICE INCLUDING THE SAME

(71) Applicant: Mitsubishi Electric Corporation, Tokyo (JP)

(72) Inventors: Kazunori Hatakeyama, Tokyo (JP); Shota Kamiya, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 14/909,498

(22) PCT Filed: Sep. 6, 2013

(86) PCT No.: PCT/JP2013/074091
§ 371 (c)(1),
(2) Date: Feb. 2, 2016

(87) PCT Pub. No.: WO2015/033437
PCT Pub. Date: Mar. 12, 2015

(65) Prior Publication Data
US 2016/0190955 A1    Jun. 30, 2016

(51) Int. Cl.
*H02P 6/00* (2016.01)
*H02M 7/06* (2006.01)
(Continued)

(52) U.S. Cl.
CPC .............. *H02M 7/06* (2013.01); *F25B 31/02* (2013.01); *H02M 1/12* (2013.01); *H02M 1/4208* (2013.01);
(Continued)

(58) Field of Classification Search
CPC ... H02M 7/06; H02M 1/12; H02P 6/00; F25B 31/02
(Continued)

(56) References Cited

U.S. PATENT DOCUMENTS

| 5,430,639 A | 7/1995 | Takahashi |
| 6,137,700 A | 10/2000 | Iida et al. |

(Continued)

FOREIGN PATENT DOCUMENTS

| CN | 1263377 A | 8/2000 |
| CN | 1183654 C | 1/2005 |

(Continued)

OTHER PUBLICATIONS

International Search Report of the International Searching Authority mailed Oct. 29, 2013 for the corresponding international application No. PCT/JP2013/074091 (and English translation).

(Continued)

*Primary Examiner* — Erick Glass
(74) *Attorney, Agent, or Firm* — Posz Law Group, PLC

(57) ABSTRACT

To provide a DC power-supply device that can suppress voltage unbalance of a plurality of capacitors serially connected between both terminals of a load, achieve stable drive of the load and long life of the capacitors, and contribute to high reliability, in a configuration in which an alternating current is converted into a direct current and is supplied to a load, and a refrigeration-cycle application device including the DC power-supply device. The DC power-supply device includes a rectifier circuit, a reactor connected to an input or an output side of the rectifier circuit, a first capacitor and a second capacitor serially connected between output terminals to a load, a charging unit that selectively charges one or both of the first capacitor and the second capacitor, and further includes a control unit that controls the charging unit so that voltage unbalance between the first capacitor and the second capacitor is suppressed.

13 Claims, 15 Drawing Sheets

(51) Int. Cl.
*H02M 3/158* (2006.01)
*F25B 31/02* (2006.01)
*H02M 1/12* (2006.01)
*H02M 1/42* (2007.01)
*H02P 27/08* (2006.01)
*H02M 1/00* (2006.01)
*H02P 25/032* (2016.01)

(52) U.S. Cl.
CPC .......... *H02M 1/4225* (2013.01); *H02M 3/158* (2013.01); *H02P 27/08* (2013.01); *H02M 2001/007* (2013.01); *H02P 25/032* (2016.02); *Y02B 70/126* (2013.01)

(58) Field of Classification Search
USPC .................................. 318/400.3, 400.01, 700
See application file for complete search history.

(56) References Cited

U.S. PATENT DOCUMENTS

| | | | |
|---|---|---|---|
| 6,181,583 | B1 | 1/2001 | Okui et al. |
| RE39,060 | E | 4/2006 | Okui et al. |
| 7,274,579 | B2 | 9/2007 | Ueda et al. |
| 7,403,400 | B2 | 7/2008 | Stanley |
| 7,576,299 | B2 | 8/2009 | Rossetto et al. |
| 8,269,141 | B2 | 9/2012 | Daniel et al. |
| 8,278,896 | B2 | 10/2012 | Horii |
| 8,498,136 | B2 | 7/2013 | Shinomoto et al. |
| 8,581,147 | B2 | 11/2013 | Kooken et al. |
| 8,823,303 | B2 | 9/2014 | Shinomoto et al. |
| 2006/0175313 | A1 | 8/2006 | Kooken et al. |
| 2009/0009920 | A1 | 1/2009 | Yamada |
| 2011/0019452 | A1 | 1/2011 | Shinomoto et al. |

FOREIGN PATENT DOCUMENTS

| | | |
|---|---|---|
| CN | 101340140 A | 1/2009 |
| CN | 101790836 A | 7/2010 |
| EP | 2164161 A2 | 3/2010 |
| JP | 58-204770 A | 11/1983 |
| JP | 58-207870 A | 12/1983 |
| JP | 03-003189 U | 1/1991 |
| JP | 03-101187 U | 10/1991 |
| JP | H05-328729 A | 12/1993 |
| JP | 06-253540 A | 9/1994 |
| JP | 08-186981 A | 7/1996 |
| JP | 08-237957 A | 9/1996 |
| JP | 2539158 Y2 | 4/1997 |
| JP | 10-174442 A | 6/1998 |
| JP | 2000-146392 A | 5/2000 |
| JP | 2009-278955 A | 10/2000 |
| JP | 2000-324843 A | 11/2000 |
| JP | 2001-050625 A | 2/2001 |
| JP | 2001-145360 | 5/2001 |
| JP | 2001-286130 A | 10/2001 |
| JP | 2002-176778 A | 6/2002 |
| JP | 2004-023948 | 1/2004 |
| JP | 2004-180422 A | 6/2004 |
| JP | 2005-045995 A | 2/2005 |
| JP | 2005-110491 A | 4/2005 |
| JP | 2005-323440 A | 11/2005 |
| JP | 2006-026736 A | 2/2006 |
| JP | 2006-223092 A | 8/2006 |
| JP | 2006-271185 A | 10/2006 |
| JP | 2006-325306 A | 11/2006 |
| JP | 2007-166783 A | 6/2007 |
| JP | 2008-012586 A | 1/2008 |
| JP | 2008-295228 A | 12/2008 |
| JP | 2009-050109 A | 3/2009 |
| JP | 2009-273230 A | 11/2009 |
| JP | 4460572 B2 | 2/2010 |
| JP | 2010-068642 A | 3/2010 |
| JP | 2010-263739 A | 11/2010 |
| JP | 2011-036020 A | 2/2011 |
| JP | 2011-061887 A | 3/2011 |
| JP | 2011-244635 A | 12/2011 |
| JP | 2012-060801 A | 3/2012 |
| JP | 2012-165539 A | 8/2012 |
| JP | 5087346 B | 9/2012 |
| JP | 2012-191761 A | 10/2012 |
| JP | 2012-231646 A | 11/2012 |
| JP | 2013-038921 A | 2/2013 |
| JP | 2013-110839 A | 6/2013 |
| JP | 5274579 B2 | 8/2013 |
| WO | 2004/071703 A1 | 8/2004 |
| WO | 2009/028053 | 3/2009 |
| WO | 2013/057857 | 4/2013 |

OTHER PUBLICATIONS

U.S. Appl. No. 14/787,527, filed Oct. 28, 2015, Kamiya et al.
U.S. Appl. No. 15/029,648, filed Apr. 15, 2016, Shinomoto et al.
U.S. Appl. No. 15/030,389, filed Apr. 19, 2016, Kamiya et al.
International Search Report mailed Dec. 10, 2013 in a related PCT application No. PCT/JP2013/078298 (with English translation).
International Search Report mailed Aug. 6, 2013 in a related PCT application No. PCT/JP2013/067395 (with English translation).
International Search Report mailed Dec. 3, 2013 in a related PCT application No. PCT/JP2013/079288 (with English translation).
U.S. Patent Office issued Office Action mail date of Feb. 3, 2017 in the related U.S. Appl. No. 15/030,389.
Office Action mailed Dec. 13, 2016 issued in corresponding JP patent application No. 2015-544677 (and English translation).
Canadian Office Action issued Jan. 31, 2017 in the related CA application No. 2,927,417.
Canadian Office Action issued Mar. 1, 2017 in the related CA application No. 2,929,041.
Office Action dated Jul. 28, 2017 issued in corresponding CN application No. 201380079210.8 (and English translation).
Office Action dated Sep. 1, 2017 issued in corresponding Korean patent application No. 10-2016-7009576 (and partial English translation).
Office Action dated Sep. 5, 2017 issued in corresponding Chinese patent application No. 201380080234.5 (and partial English translation).
Office Action dated Sep. 12, 2017 issued in corresponding Mexican PCT patent application No. MX/a/2016/005367 (and partial English translation).
Office Action dated Jan. 9, 2018 issued in corresponding CN application No. 201380079210.8 (and English translation).
Office Action dated Feb. 6, 2018 issued in corresponding CN application No. 201380080595.X (and English translation).

DC POWER-SUPPLY DEVICE AND REFRIGERATION-CYCLE APPLICATION DEVICE INCLUDING THE SAME

CROSS REFERENCE TO RELATED APPLICATIONS

This application is a U.S. national stage application of International Patent Application No. PCT/JP2013/074091 filed on Sep. 6, 2013, the disclosure of which is incorporated herein by reference.

TECHNICAL FIELD

The present invention relates to a DC power-supply device and a refrigeration-cycle application device including the same.

BACKGROUND

Conventionally, in a DC power-supply device that uses, as a load, an inverter that drives a compressor motor or the like used in an air conditioner, a heat-pump water heater, a refrigerator, a freezer, and the like, as a configuration that converts an alternating current into a direct current, for example, a configuration that converts a single-phase alternating current into a direct current (for example, Patent Literature 1) and a configuration that converts a three-phase alternating current into a direct current have been disclosed (for example, Patent Literature 2). In these conventional techniques, switching loss can be decreased by keeping the switching frequency low, thereby enabling to achieve high efficiency.

In the conventional technique described above, by serially connecting a plurality of capacitors between both terminals of the load and charging the capacitors, a voltage value to be supplied to the load is controlled. In such a configuration, in order to stabilize a supply voltage to the load and achieve high reliability and long life of the capacitors, the voltage of the capacitors needs to be balanced. As such a technique, for example, there have been disclosed a configuration in which in a half-bridge AC/DC converter, an unbalance detection circuit including first and second detection resistors having the same resistance value is provided between both terminals of the load, to detect a middle-point voltage as an unbalance detection voltage, thereby executing control such that the unbalance detection voltage becomes constant (for example, Patent Literature 3), for example, a configuration in which in a DC/DC converter, a voltage detector that detects a voltage between both ends of two capacitors is provided, to output a pulse-modulated pulse on the basis of an output of the voltage detector, thereby to appropriately control a switching operation (for example, Patent Literature 4).

PATENT LITERATURES

Patent Literature 1: Japanese Patent Application Laid-open No. 2000-278955
Patent Literature 2: Japanese Patent No. 5087346
Patent Literature 3: Japanese Patent Application Laid-open No. H5-328729
Patent Literature 4: Japanese Patent Application Laid-open No. 2008-295228

However, in the technique described in Patent Literature 3, an unbalance detection circuit is required, thereby causing not only cost increase but also power consumption by respective detection resistors, which is inefficient. Further, there is a problem in that voltage unbalance between the capacitors may not be able to be suppressed, due to a decrease in accuracy of a detection value because of unevenness of resistance values of the detection resistors, or deterioration of an S/N ratio in the case of using large-size resistors having high resistance in order to suppress power consumption of the detection resistors, which is caused by high voltage to be supplied to the load.

The technique described in Patent Literature 4 is for the DC/DC converter, and assumes a case in which a power-supply voltage is a direct current. In this case, different from a case where the power-supply voltage is an alternating current, control is relatively easy because amplitude variation of an input voltage due to a pulsation component of an alternating frequency does not occur. However, when the power-supply voltage is an alternating current, amplitude variation of the input voltage occurs due to the pulsation component of the alternating frequency. Therefore, when the power-supply voltage is an alternating current, a control system needs to be constructed, taking into consideration a power-supply frequency and amplitude variation. As described in Patent Literature 4, if control is executed by detecting only the voltage of two capacitors, there are problems in that control becomes unstable and the capacitor voltage becomes vibrational to increase a ripple current, thereby accelerating deterioration of life of the capacitor.

SUMMARY

The present invention has been achieved in view of the above problems, and an object of the present invention is to provide a DC power-supply device that can suppress voltage unbalance between a plurality of capacitors serially connected between both terminals of a load, achieve stable drive of the load and long life of the capacitors, and contribute to high reliability in a configuration in which an alternating current is converted into a direct current and is supplied to the load, and a refrigeration-cycle application device including the DC power-supply device.

In order to solve the aforementioned problems, a DC power-supply device according to one aspect of the present invention that converts an alternating current into a direct current and supplies the direct current to a load is so constructed as to include a rectifier circuit that rectifies the alternating current, a reactor connected to an input side or an output side of the rectifier circuit, a first capacitor and a second capacitor serially connected between output terminals to the load; a charging unit that selectively charges one or both of the first capacitor and the second capacitor, and a control unit that controls the charging unit, wherein the control unit controls the charging unit such that voltage unbalance between the first capacitor and the second capacitor is suppressed on the basis of a voltage of the first capacitor at a timing synchronized with a voltage phase of the alternating current and a voltage of the second capacitor at the timing.

According to the present invention, it is possible to suppress voltage unbalance between a plurality of capacitors serially connected between both terminals of a load, achieve stable drive of the load and long life of the capacitors, and contribute to high reliability in a configuration in which an alternating current is converted into a direct current and is supplied to the load.

DETAILED DESCRIPTION

Exemplary embodiments of a DC power-supply device and a refrigeration-cycle application device including the same according to the present invention will be explained below in detail with reference to the accompanying drawings. The present invention is not limited to the embodiments.

First Embodiment

Figure 1:
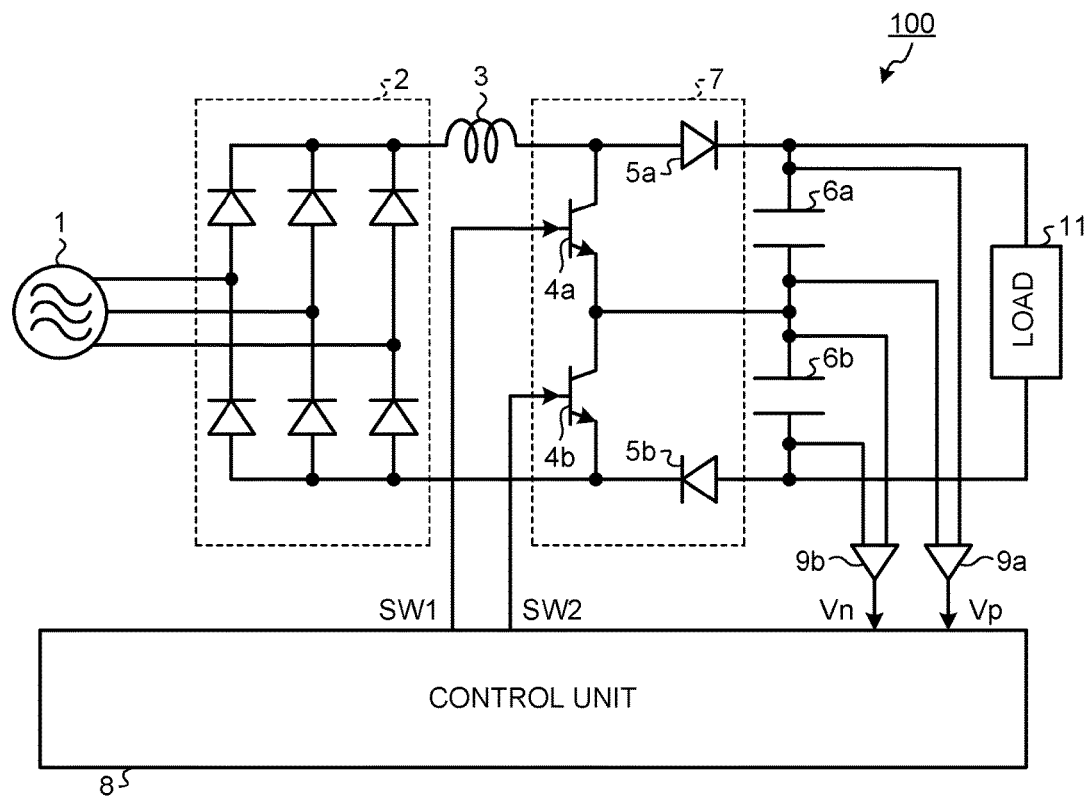
FIG. 1 is a diagram illustrating a configuration example of a DC power-supply device according to a first embodiment.

FIG. 1 is a diagram illustrating a configuration example of a DC power-supply device according to a first embodiment. As illustrated in FIG. 1, a DC power-supply device 100 according to the first embodiment has a configuration in which a three-phase alternating current supplied from an AC power supply 1 is converted into a direct current and is supplied to a load 11. In the present embodiment, it is assumed that the load 11 is an inverter load or the like that drives a compressor motor used in, for example, a refrigeration-cycle application device. However, needless to mention, it is not limited thereto.

The DC power-supply device 100 includes a rectifier circuit 2 that rectifies a three-phase alternating current, a reactor 3 connected to an output side of the rectifier circuit 2, a first capacitor 6a and a second capacitor 6b serially connected between output terminals to the load 11, a charging unit 7 that selectively charges one or both of the first capacitor 6a and the second capacitor 6b, a control unit 8 that controls the charging unit 7, a first voltage detection unit 9a that detects a voltage Vp of the first capacitor 6a, and a second voltage detection unit 9b that detects a voltage Vn of the second capacitor 6b. In the example illustrated in FIG. 1, the rectifier circuit 2 is configured as a three-phase full-wave rectifier circuit in which six rectifier diodes are full-bridge connected. In the example illustrated in FIG. 1, while an example in which the reactor 3 is connected to the output side of the rectifier circuit 2 is illustrated, the reactor 3 can be configured to be connected to an input side of the rectifier circuit 2 for each phase.

The charging unit 7 includes a first switching element 4a that switches charging and non-charging of the first capacitor 6a, a second switching element 4b that switches charging and non-charging of the second capacitor 6b, a first backflow prevention element 5a that prevents backflow of a charged electric charge of the first capacitor 6a to the first switching element 4a, and a second backflow prevention element 5b that prevents backflow of the charged electric charge of the second capacitor 6b to the second switching element 4b.

A midpoint of a series circuit including the first switching element 4a and the second switching element 4b and a midpoint of a series circuit including the first capacitor 6a and the second capacitor 6b are connected to each other. The first backflow prevention element 5a is connected in the forward direction from the collector of the first switching element 4a toward a connection point between the first capacitor 6a and the load 11, and the second backflow prevention element 5b is connected in the forward direction from a connection point between the second capacitor 6b and the load 11 toward the emitter of the second switching element 4b.

A capacitor having the same capacity is used for the first capacitor 6a and the second capacitor 6b. For the first switching element 4a and the second switching element 4b, for example, a semiconductor element such as a power transistor, a power MOSFET, or an IGBT is used.

The control unit 8 controls a direct current voltage to be supplied to the load 11 by executing on/off control of the first switching element 4a and the second switching element 4b. The switching control of the first switching element 4a and the second switching element 4b by the control unit 8 is described with reference to FIGS. 1 to 3.

Figure 2:
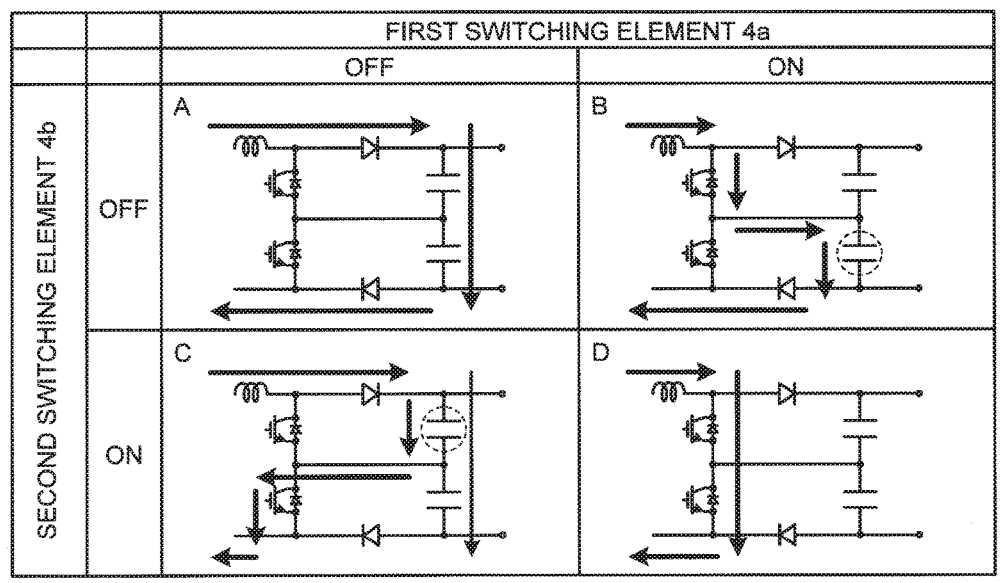
FIG. 2 is a diagram illustrating a switching control state in the DC power-supply device according to the first embodiment.

FIG. 2 is a diagram illustrating a switching control state in the DC power-supply device according to the first embodiment. In the example illustrated in FIG. 2, reference signs of each of the constituent elements are omitted.

A state A indicates a state where both the first switching element 4a and the second switching element 4b are controlled to be off. In this state, charging of both the first capacitor 6a and the second capacitor 6b is performed.

A state B indicates a state where only the first switching element 4a is controlled to be on. In this state, only the second capacitor 6b is charged.

A state C indicates a state where only the second switching element 4b is controlled to be on. In this state, only the first capacitor 6a is charged.

A state D indicates a short-circuit state where both the first switching element 4a and the second switching element 4b are controlled to be on. In this state, charging of neither the first capacitor 6a nor the second capacitor 6b is performed.

According to the present embodiment, by appropriately switching the respective states illustrated in FIG. 2, the direct current voltage to be supplied to the load 11 is controlled.

Figure 3:
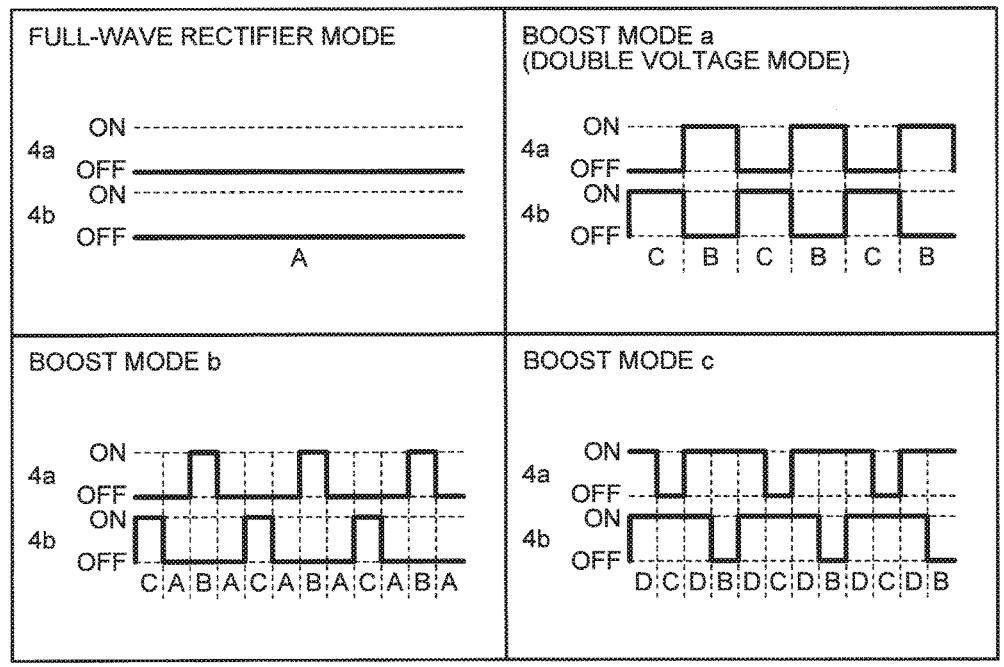
FIG. 3 is a diagram illustrating respective operating modes in the DC power-supply device according to the first embodiment.

FIG. 3 is a diagram illustrating operating modes in the DC power-supply device according to the first embodiment. As illustrated in FIG. 3, as the operating modes in the DC power-supply device 100 according to the first embodiment, there are a full-wave rectifier mode in which the first switching element 4a and the second switching element 4b are always in an off-controlled state, and a boost mode in which the first switching element 4a and the second switching element 4b are alternately controlled to be on.

The boost mode includes a boost mode a (a double voltage mode) in which an on-duty ratio of the first switching element 4a and the second switching element 4b is 50%, a boost mode b in which the on-duty ratio of the first switching element 4a and the second switching element 4b is less than 50%, and a boost mode c in which the on-duty ratio of the first switching element 4a and the second switching element 4b is larger than 50%.

In the full-wave rectifier mode, by controlling the first switching element 4a and the second switching element 4b to be always in an off-controlled state, a voltage full-wave rectified by the rectifier circuit 2 becomes an output voltage.

In the boost mode a (the double voltage mode), the on-timing of the first switching element 4a and the off-timing of the second switching element 4b are substantially simultaneous, and the off-timing of the first switching element 4a and the on-timing of the second switching element 4b are substantially simultaneous, thereby repeating the state B and the state C illustrated in FIG. 2. The output voltage at this time is about twice as high as the output voltage in the full-wave rectifier mode.

In the boost mode b, a simultaneous off-period is provided, in which both the first switching element 4a and the second switching element 4b are controlled to be off. At this time, a state transition of the state B→A→C→A illustrated in FIG. 2 is periodically repeated. The output voltage at this time is an intermediate voltage between the output voltage in the full-wave rectifier mode and the output voltage in the boost mode a (the double voltage mode).

In the boost mode c, a simultaneous on-period is provided, in which both the first switching element 4a and the second switching element 4b are controlled to be on. At this time, a state transition of the state D→C→D→B illustrated in FIG. 2 is periodically repeated. In the simultaneous on-period (here, a period in the state D), energy is accumulated in the reactor 3. The output voltage at this time is a voltage equal to or higher than the output voltage in the boost mode a (the double voltage mode).

In this manner, in the present embodiment, by changing the on-duty ratio of the first switching element 4a and the second switching element 4b, the direct current voltage to be supplied to the load 11 can be controlled.

A charging frequency of the first capacitor 6a and the second capacitor 6b in the respective boost modes of the DC power-supply device 100 according to the first embodiment is described next with reference to FIG. 1. It is assumed here that the charging frequency of the first capacitor 6a and the second capacitor 6b indicates a switching frequency that is an inverse number of one cycle, when a period obtained by combining a charging period and a non-charging period of a pair of the first capacitor 6a and the second capacitor 6b, that is, a period obtained by combining an on-period and an off-period of a pair of the first switching element 4a and the second switching element 4b is designated as one cycle. In the following descriptions, the "charging frequency" is used for the descriptions mainly expressing the first capacitor 6a and the second capacitor 6b, and the "switching frequency" is used for the descriptions mainly expressing the first switching element 4a and the second switching element 4b.

In the present embodiment, control is executed so that the charging frequency of the first capacitor 6a and the second capacitor 6b becomes 3n times (n is a natural number) the frequency of the three-phase alternating current. That is, the switching frequency is set to 3n times the frequency of the three-phase alternating current, and the first switching element 4a and the second switching element 4b are alternately controlled to be on. By executing control in this manner, because distortions appearing in the respective phase currents at the time of executing the switching control occur in the same phase for each phase, and thus the waveforms of the respective phase currents can be similar to each other, while being shifted by 120 degrees with respect to the power supply cycle, and thus unbalance between each of the phase currents of the three-phase alternating current can be resolved.

On the other hand, when the switching frequency is set to a frequency other than 3n times the frequency of the three-phase alternating current, the waveforms of the respective phase currents are not similar to each other, and the respective phase currents are unbalanced. Also in a case where the switching control is executed in synchronization with the frequency of the three-phase alternating current, the respective phase currents of the three-phase alternating current are unbalanced in a similar manner.

That is, if switching of the first switching element 4a and the second switching element 4b is not performed at a frequency 3n times the frequency of the three-phase alternating current, but is performed with a phase different for each phase, unbalance between the respective phase currents occurs. As a result, the distortion rate of the respective phase currents increases, thereby causing deterioration of the power factor and an increase in the harmonic current.

According to the present embodiment, as described above, by executing the control in such a manner that the switching frequency of the first switching element 4a and the second switching element 4b, that is, the charging frequency of the first capacitor 6a and the second capacitor 6b becomes 3n times the frequency of the three-phase alternating current, switching of the first switching element 4a and the second switching element 4b is performed in the same phase of respective phases of the three-phase alternating current, while being shifted by 120 degrees with respect to the power supply cycle. Therefore, even in the boost mode b in which there is the simultaneous off-period of the first switching element 4a and the second switching element 4b, or in the boost mode c in which there is the simultaneous on-period of the first switching element 4a and the second switching element 4b, the waveforms of the respective phase currents of the three-phase alternating current are similar to each other. Accordingly, unbalance between the respective phase currents does not occur, and thus the distortion rate of the respective phase currents takes a minimum value, thereby enabling to improve the power factor and to suppress the harmonic current.

Furthermore, if n=1 is established, that is, the first switching element 4a and the second switching element 4b are controlled to be on alternately at a frequency three times the frequency of the three-phase alternating current, an amount of noise generation can be reduced and other devices connected to the same system can be less affected.

50 hertz and 60 hertz are widely used as the power supply frequency, and when it is required that the DC power-supply device uses these frequencies properly depending on its installation place, by providing a power-supply voltage detection unit (not illustrated) such as a sensor that detects a power-supply voltage to detect a zero-cross timing of the power-supply voltage, the frequency of the AC power supply 1 can be ascertained. By performing the switching operation at a frequency 3m times (m is a natural number) of 300 hertz, which is the least common multiple of 50 hertz and 60 hertz, unbalance between the respective phase currents can be resolved without ascertaining the frequency of the AC power supply 1, which also contributes to cost reduction, because the power-supply voltage detection unit is not required.

Figure 4:
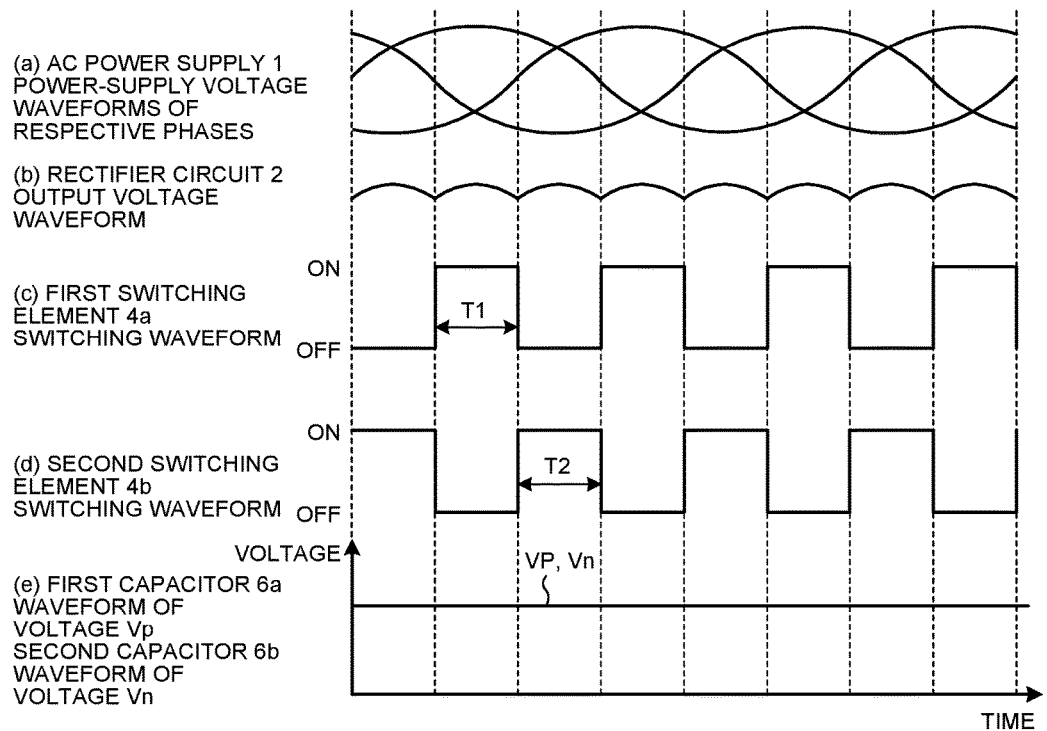
FIG. 4 is a diagram illustrating an example in which a switching operation is performed at a correct timing in a boost mode a (a double voltage mode) of the DC power-supply device according to the first embodiment.
Figure 5:
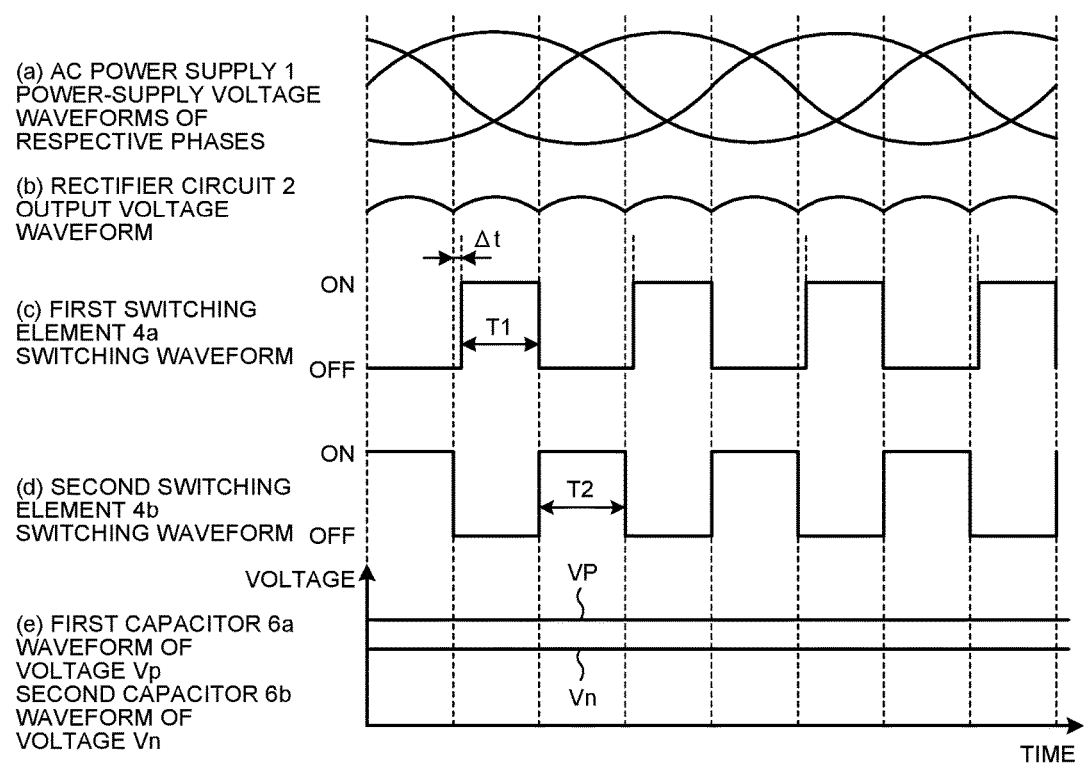
FIG. 5 is a diagram illustrating an example in which an on-timing of a first switching element is delayed in the boost mode a (the double voltage mode) of the DC power-supply device according to the first embodiment.

A specific example in which the voltage Vp of the first capacitor 6a and the voltage Vn of the second capacitor 6b are unbalanced is described with reference to FIG. 1, and FIGS. 4 and 5. FIG. 4 is a diagram illustrating an example in which a switching operation is performed at a correct timing in the boost mode a (a double voltage mode) of the DC power-supply device according to the first embodiment. FIG. 5 is a diagram illustrating an example in which an on-timing of the first switching element is delayed in the boost mode a (the double voltage mode) of the DC power-supply device according to the first embodiment.

In examples illustrated in FIGS. 4 and 5, an example in which n=1 is established, that is, the first switching element 4a and the second switching element 4b are alternately controlled to be on at a frequency three times the frequency of the three-phase alternating current is illustrated. FIGS. 4(a) and 5(a) respectively illustrate a power-supply voltage waveform of the respective phases. FIGS. 4(b) and 5(b) respectively illustrate an output voltage waveform of the rectifier circuit 2. FIGS. 4(c) and 5(c) respectively illustrate a switching waveform of the first switching element 4a. FIGS. 4(d) and 5(d) respectively illustrate a switching waveform of the second switching element 4b. FIGS. 4(e) and 5(e) respectively illustrate a waveform of the voltage Vp of the first capacitor 6a and a waveform of the voltage Vn of the second capacitor 6b.

In FIGS. 4 and 5, an on-period T1 of the first switching element 4a is equal to the charging period of the second capacitor 6b, and an on-period T2 of the second switching element 4b is equal to the charging period of the first capacitor 6a. As illustrated in FIG. 4, when the on-period T1 of the first switching element 4a, that is, the charging period of the second capacitor 6b is equal to the on-period T2 of the second switching element 4b, that is, the charging period of the first capacitor 6a (see FIGS. 4(c) and 4(d)), the voltage Vp of the first capacitor 6a and the voltage Vn of the second capacitor 6b become equivalent (see FIG. 4(e)).

Meanwhile, as illustrated in FIG. 5, if the on-timing of the first switching element 4a is delayed by $\Delta t$ due to element variation or the like, and the on-period T1 of the first switching element 4a, that is, the charging period of the second capacitor 6b becomes shorter than the on-period T2 of the second switching element 4b, that is, the charging period of the first capacitor 6a (T1=T2−$\Delta t$<T2, see FIGS. 5(c) and 5(d)), the voltage Vp of the first capacitor 6a becomes higher than the voltage Vn of the second capacitor 6b, and the voltage Vp of the first capacitor 6a and the voltage Vn of the second capacitor 6b are unbalanced (Vp>Vn, see FIG. 5(e)). In this case, if the operation is continued in the boost mode a, that is, in the double voltage mode, the voltage (here, Vp) of one capacitor (here, the first capacitor 6a) becomes high, and the lifetime of the capacitor (here, the first capacitor 6a) becomes short, or a voltage exceeding a device withstand voltage may be applied. Therefore, control needs to be executed so that the voltage Vp of the first capacitor 6a and the voltage Vn of the second capacitor 6b become equivalent. This control is referred to as "voltage unbalance suppression control".

Figure 6:
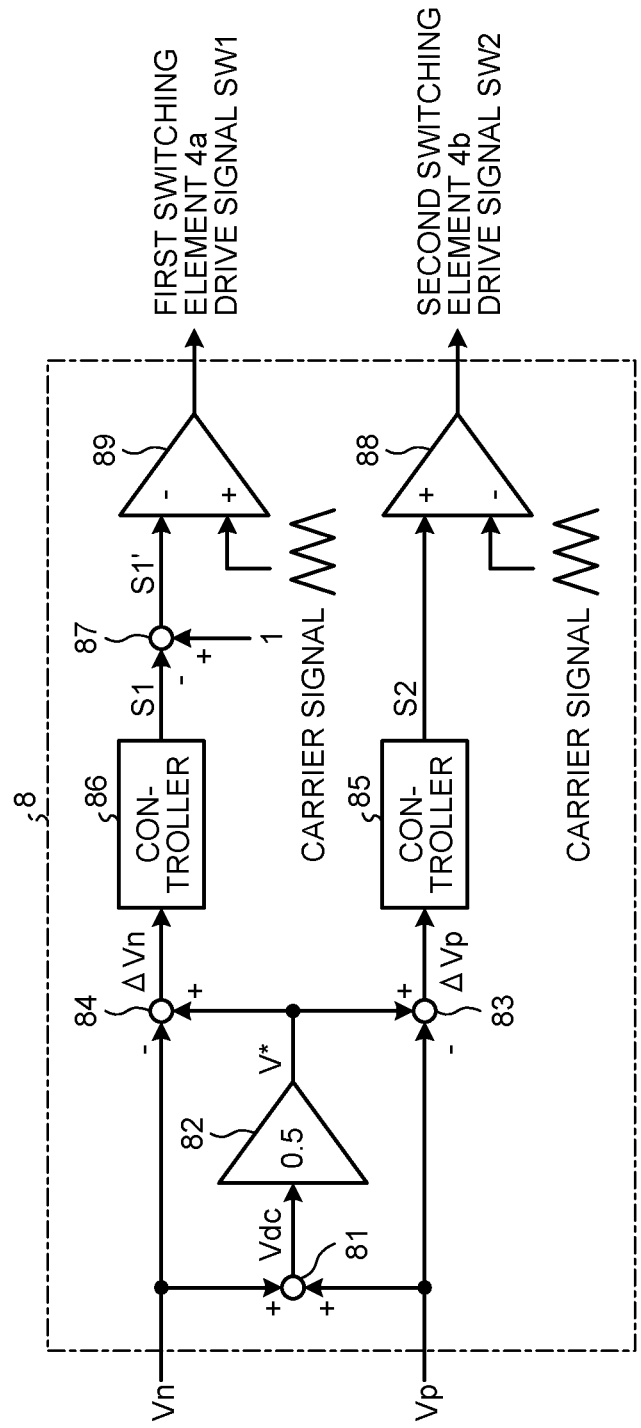
FIG. 6 is a diagram illustrating a configuration example of a control unit of the DC power-supply device according to the first embodiment.

FIG. 6 is a diagram illustrating a configuration example of a control unit of the DC power-supply device according to the first embodiment. The control unit 8 includes an adder 81 that adds the voltage Vp of the first capacitor 6a and the voltage Vn of the second capacitor 6b, an amplifier 82 that halves a DC bus voltage Vdc, which is an output value of the adder 81, a difference value calculator 83 that calculates a difference value $\Delta Vp$ between a target voltage V*, which is an output value of the amplifier 82, and the voltage Vp of the first capacitor 6a, a difference value calculator 84 that calculates a difference value $\Delta Vn$ between the target voltage V*, which is the output value of the amplifier 82, and the voltage Vn of the second capacitor 6b, a controller 85 that outputs a control value S2 to make the difference value $\Delta Vp$ zero, a controller 86 that outputs a control value S1 to make the difference value $\Delta Vn$ zero, a correction unit 87 that outputs a correction value S1' obtained by subtracting the control value S1 from 1, a comparator 88 that compares a carrier signal with the control value S2 to generate a drive signal SW2 of the second switching element 4b, and a comparator 89 that compares the carrier signal with the correction value S1' to generate a drive signal SW1 of the first switching element 4a.

As illustrated in FIG. 1, in the case where the AC power supply 1 is a three-phase AC power supply, as illustrated in FIGS. 4(b) and 5(b), an output voltage of the rectifier circuit 2 is a direct current voltage that pulses at a frequency six times the frequency of the three-phase alternating current (see FIGS. 4(b) and 5(b)). That is, to execute a stable voltage unbalance suppression control, it is required to execute the control by detecting the voltage Vp of the first capacitor 6a and the voltage Vn of the second capacitor 6b, at least in synchronization with the voltage phase of the AC power supply 1. More preferably, it will be sufficient if the voltage Vp of the first capacitor 6a and the voltage Vn of the second capacitor 6b are detected, in synchronization with the output voltage of the rectifier circuit 2 that pulses at the frequency six times the frequency of the three-phase alternating current. In the following descriptions, an example of executing the voltage unbalance suppression control in synchronization with the output voltage of the rectifier circuit 2 is described.

The control unit 8 captures therein the voltage Vp of the first capacitor 6a, which is a detection value of the first voltage detection unit 9a, and the voltage Vn of the second capacitor 6b, which is a detection value of the second voltage detection unit 9b, in synchronization with the output voltage of the rectifier circuit 2. The voltage between both ends of a series circuit formed of the first capacitor 6a and the second capacitor 6b, that is, the DC bus voltage Vdc to be applied to the load 11 is obtained by adding the captured voltages Vp and Vn by using the adder 81. The target voltage V* of the voltage Vp of the first capacitor 6a and the voltage Vn of the second capacitor 6b is obtained by halving the DC bus voltage Vdc by using the amplifier 82. The voltage unbalance suppression control is realized by controlling such that the voltage Vp of the first capacitor 6a and the voltage Vn of the second capacitor 6b approach to the target voltage V*.

Subsequently, the control unit 8 calculates the difference value ΔVp between the target voltage V* and the captured voltage Vp of the first capacitor 6a by using the difference value calculator 83, and calculates the difference value ΔVn between the target voltage V* and the captured voltage Vn of the second capacitor 6b by using the difference value calculator 84. The controller 85 obtains the control value S2 to make the difference value ΔVp zero. The comparator 88 compares the carrier signal with the control value S2 to generate a drive signal SW2 of the second switching element 4b. The controller 86 obtains the control value S1 to make the difference value ΔVn zero. The correction unit 87 outputs the correction value S1' obtained by subtracting the control value S1 from 1. The comparator 89 compares the carrier signal with the correction value S1' to generate a drive signal SW1 of the first switching element 4a.

The controllers 85 and 86 can execute, for example, proportional-integral (PI) control, proportional (P) control, or proportional-integral-derivative (PID) control. Needless to mention, any control can be executed, so long as the control values S1 and S2 to make the difference values ΔVp and ΔVn respectively zero are acquired. The present invention is not limited to the control method of these controllers 85 and 86. In the proportional-integral (PI) control, in a case in which the target voltage V* does not completely match the captured voltage Vp of the first capacitor 6a or the captured voltage Vn of the second capacitor 6b due to limitation of performance, errors of the difference values ΔVp and ΔVn are accumulated, and if the proportional-integral (PI) control is realized by, for example, a microcomputer or the like, an erroneous operation may occur due to overflow. In such a case, the reliability can be improved by providing limiters of upper and lower limits to the control values S1 and S2. In this case, it is desirable to set a bottom point and a top point of the carrier signal as values of the upper and lower limiters.

As a timing for capturing the voltage Vp of the first capacitor 6a, which is the detection value of the first voltage detection unit 9a, and the voltage Vn of the second capacitor 6b, which is the detection value of the second voltage detection unit 9b, for example, the zero-cross timing of the AC power supply 1 can be detected to decide the timing by using an output of the power-supply voltage detection unit (not illustrated) described above, or if the frequency of the AC power supply 1 is determined beforehand, the voltages can be captured at a timing according to the frequency.

Figure 7:
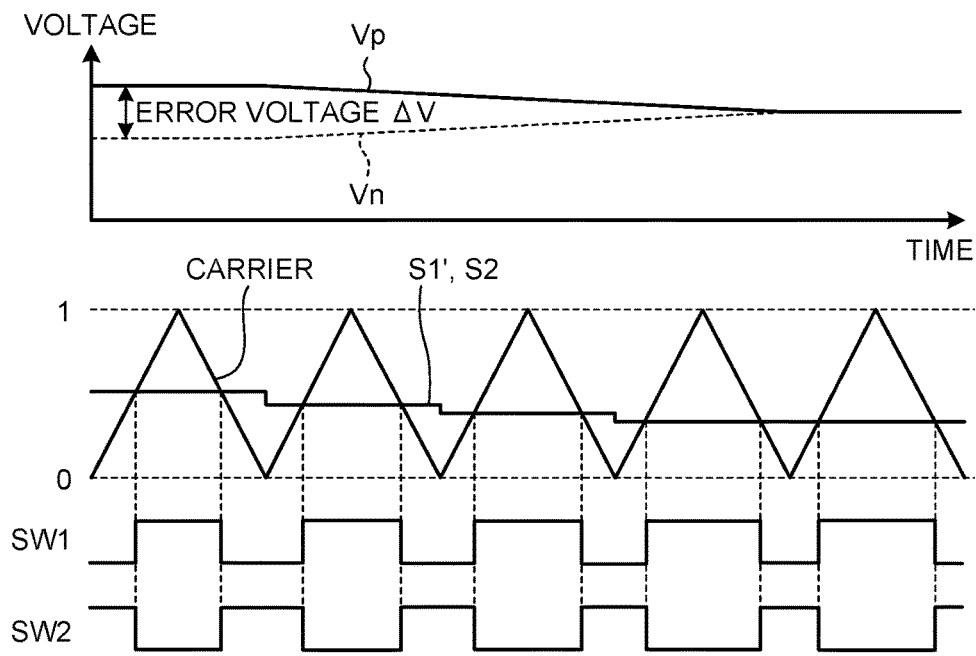
FIG. 7 is a diagram illustrating an example of voltage unbalance suppression control in the boost mode a (the double voltage mode) of the DC power-supply device according to the first embodiment.
Figure 8:
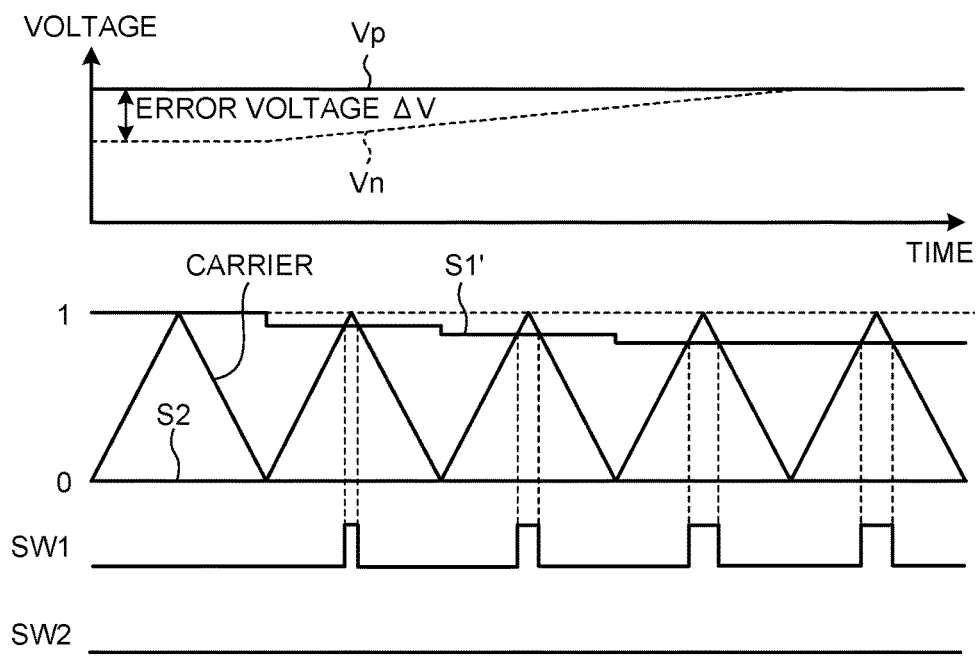
FIG. 8 is a diagram illustrating an example of voltage unbalance suppression control in a full-wave rectifier mode of the DC power-supply device according to the first embodiment.
Figure 9:
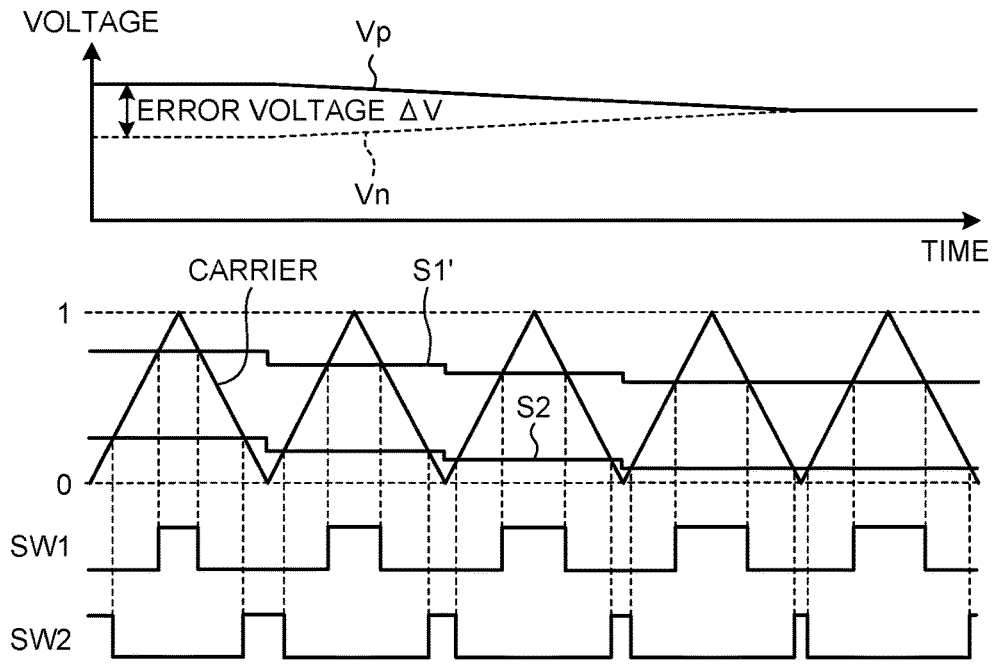
FIG. 9 is a diagram illustrating an example of voltage unbalance suppression control in a boost mode b of the DC power-supply device according to the first embodiment.
Figure 10:
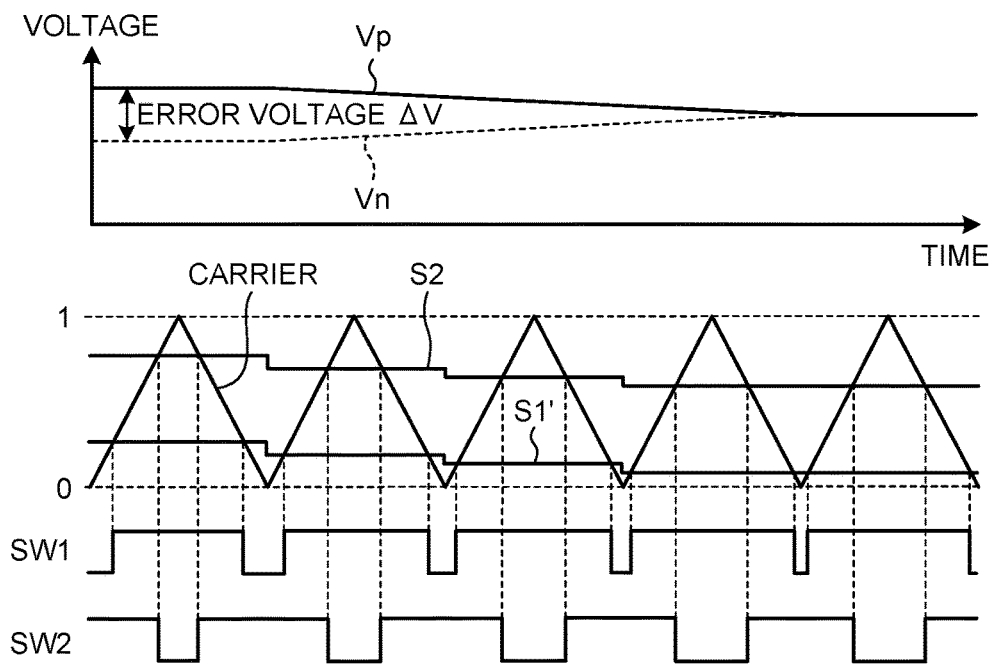
FIG. 10 is a diagram illustrating an example of voltage unbalance suppression control in a boost mode c of the DC power-supply device according to the first embodiment.

FIG. 7 is a diagram illustrating an example of voltage unbalance suppression control in the boost mode a (the double voltage mode) of the DC power-supply device according to the first embodiment. FIG. 8 is a diagram illustrating an example of voltage unbalance suppression control in a full-wave rectifier mode of the DC power-supply device according to the first embodiment. FIG. 9 is a diagram illustrating an example of voltage unbalance suppression control in the boost mode b of the DC power-supply device according to the first embodiment. FIG. 10 is a diagram illustrating an example of voltage unbalance suppression control in the boost mode c of the DC power-supply device according to the first embodiment. In the examples illustrated in FIGS. 7 to 10, an example in which the voltage Vp of the first capacitor 6a is higher than the voltage Vn of the second capacitor 6b by an error voltage ΔV in an initial state is illustrated.

In the boost mode a (the double voltage mode), as illustrated in FIG. 7, a high period of the drive signal SW1 of the first switching element 4a becomes gradually longer, and a high period of the drive signal SW2 of the second switching element 4b becomes gradually shorter, by using the voltage unbalance suppression control described above. As a result, the on-duty ratio of the first switching element 4a and the second switching element 4b changes, and the on-period of the first switching element 4a, that is, the charging period of the second capacitor 6b becomes longer, and the on-period of the second switching element 4b, that is, the charging period of the first capacitor 6a becomes shorter. Accordingly, the voltage Vp of the first capacitor 6a falls and the voltage Vn of the second capacitor 6b rises, thereby suppressing voltage unbalance between the first capacitor 6a and the second capacitor 6b.

In the full-wave rectifier mode, as illustrated in FIG. 8, the high period of the drive signal SW1 of the first switching element 4a appears, with the drive signal SW2 of the second switching element 4b being maintained to be low, and the high period of the drive signal SW1 gradually becomes longer, by the voltage unbalance suppression control described above. As a result, the on-period of the first switching element 4a, that is, the charging period of the second capacitor 6b is generated, and the charging period of the second capacitor 6b gradually becomes longer. Accordingly, the voltage Vn of the second capacitor 6b rises, and the voltage unbalance between the first capacitor 6a and the second capacitor 6b is suppressed.

In the boost mode b, as in the boost mode a (the double voltage mode), as illustrated in FIG. 9, the high period of the drive signal SW1 of the first switching element 4a becomes gradually longer, and the high period of the drive signal SW2 of the second switching element 4b becomes gradually shorter, by using the voltage unbalance suppression control described above. As a result, the on-duty ratio of the first switching element 4a and the second switching element 4b changes, and the on-period of the first switching element 4a, that is, the charging period of the second capacitor 6b becomes longer, and the on-period of the second switching element 4b, that is, the charging period of the first capacitor 6a becomes shorter. Accordingly, the voltage Vp of the first capacitor 6a falls and the voltage Vn of the second capacitor 6b rises, thereby suppressing the voltage unbalance between the first capacitor 6a and the second capacitor 6b.

Also in the boost mode c, as in the boost mode a (the double voltage mode) and the boost mode b, as illustrated in FIG. 10, the high period of the drive signal SW1 of the first switching element 4a becomes gradually longer, and the high period of the drive signal SW2 of the second switching element 4b becomes gradually shorter, by using the voltage unbalance suppression control described above. As a result, the on-duty ratio of the first switching element 4a and the second switching element 4b changes, and the on-period of the first switching element 4a, that is, the charging period of the second capacitor 6b becomes longer, and the on-period of the second switching element 4b, that is, the charging period of the first capacitor 6a becomes shorter. Accordingly, the voltage Vp of the first capacitor 6a falls and the voltage Vn of the second capacitor 6b rises, thereby suppressing the voltage unbalance between the first capacitor 6a and the second capacitor 6b.

Figure 11:
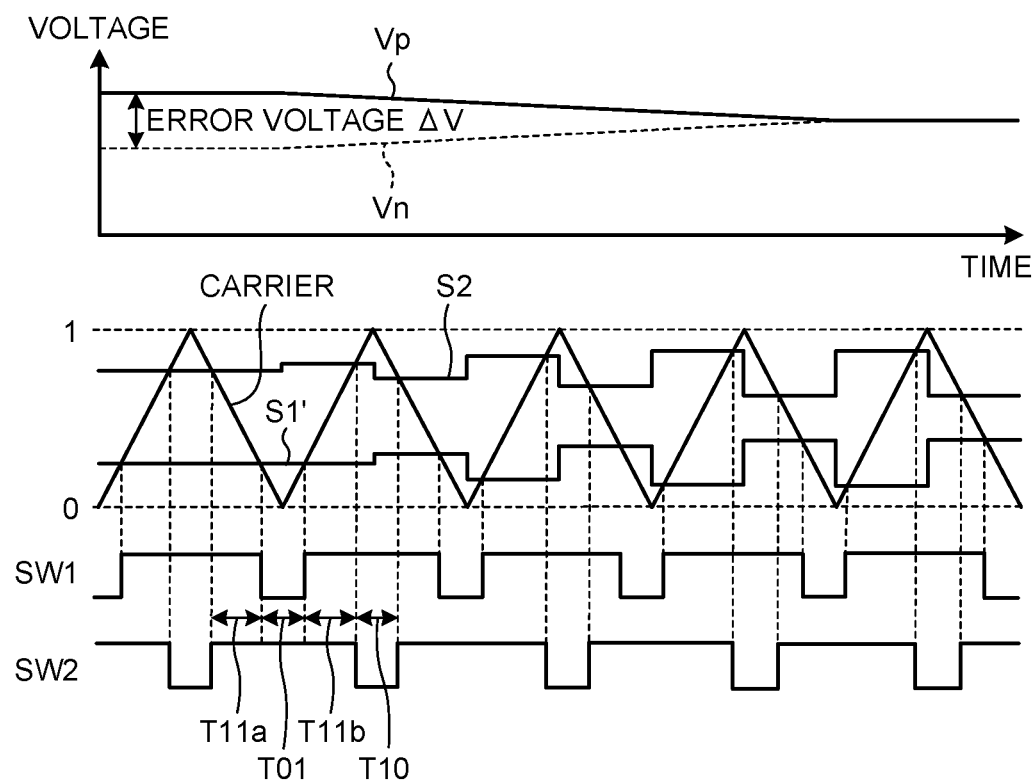
FIG. 11 is a diagram illustrating an example different from the voltage unbalance suppression control illustrated in FIG. 10 in the boost mode c of the DC power-supply device according to the first embodiment.

In the boost mode c, voltage unbalance between the voltage Vp of the first capacitor 6a and the voltage Vn of the second capacitor 6b can be suppressed by using a method different from the above-described voltage unbalance suppression control. FIG. 11 is a diagram illustrating an example different from voltage unbalance suppression control illustrated in FIG. 10 in the boost mode c of the DC power-supply device according to the first embodiment.

As illustrated in FIG. 11, it is defined that a low period of the drive signal SW1 of the first switching element 4a is T01, a low period of the drive signal SW2 of the second switching element 4b is T10, a simultaneous high period of the drive signal SW1 of the first switching element 4a and the drive signal SW2 of the second switching element 4b immediately before T01 is T11a, and a simultaneous high period of the drive signal SW1 of the first switching element 4a and the drive signal SW2 of the second switching element 4b immediately before T10 is T11b.

In the simultaneous high period of the drive signal SW1 of the first switching element 4a and the drive signal SW2 of the second switching element 4b, because the first switching element 4a and the second switching element 4b are simultaneously turned on, a short-circuit current flows from the AC power supply 1 via the reactor 3, and energy of $(L \times I^2)/2$ is accumulated in the reactor 3. By changing T11a and T11b, which are the simultaneous high periods of the drive signal SW1 of the first switching element 4a and the drive signal SW2 of the second switching element 4b to make the simultaneous on-period of the first switching element 4a and the second switching element 4b variable, an accumulated amount of energy in the reactor 3 can be changed, thereby making an amount of charge of the first capacitor 6a and the second capacitor 6b variable. For example, if T11a becomes longer, the first capacitor 6a to be charged in T01 immediately thereafter is charged with larger energy, and if T11b becomes longer, the second capacitor 6b to be charged in T10 immediately thereafter is charged with larger energy. Accordingly, for example, even if T01 and T10 are made equal to each other, as illustrated in FIG. 11, by controlling the phases of the drive signal SW1 of the first switching element 4a and the drive signal SW2 of the second switching element 4b so as to establish T11a<T11b, as a result, an on-timing of the first switching element 4a and an on-timing of the second switching element 4b change, and change the relation between the phase of the on-period of the first switching element 4a, that is, a charging phase of the second capacitor 6b, and the phase of the on-period of the second switching element 4b, that is, a charging phase of the first capacitor 6a. Consequently, the voltage Vp of the first capacitor 6a falls and the voltage Vn of the second capacitor 6b rises, thereby enabling to suppress the voltage unbalance between the first capacitor 6a and the second capacitor 6b.

In the example illustrated in FIG. 1, the examples in which the DC voltage is applied to the load 11 in the respective modes of the full-wave rectifier mode, the boost mode a (the double voltage mode), the boost mode b, and the boost mode c have been described. However, a configuration in which the power is supplied to a load having an operating voltage lower than that of the load 11 can be considered. In this case, when the configuration is such that the DC bus voltage Vdc is applied to the load as in the load 11, not only a step-down circuit is required, but also it is required to configure the step-down circuit and the load by using a high withstand voltage component, which may lead to cost increase.

Figure 12:
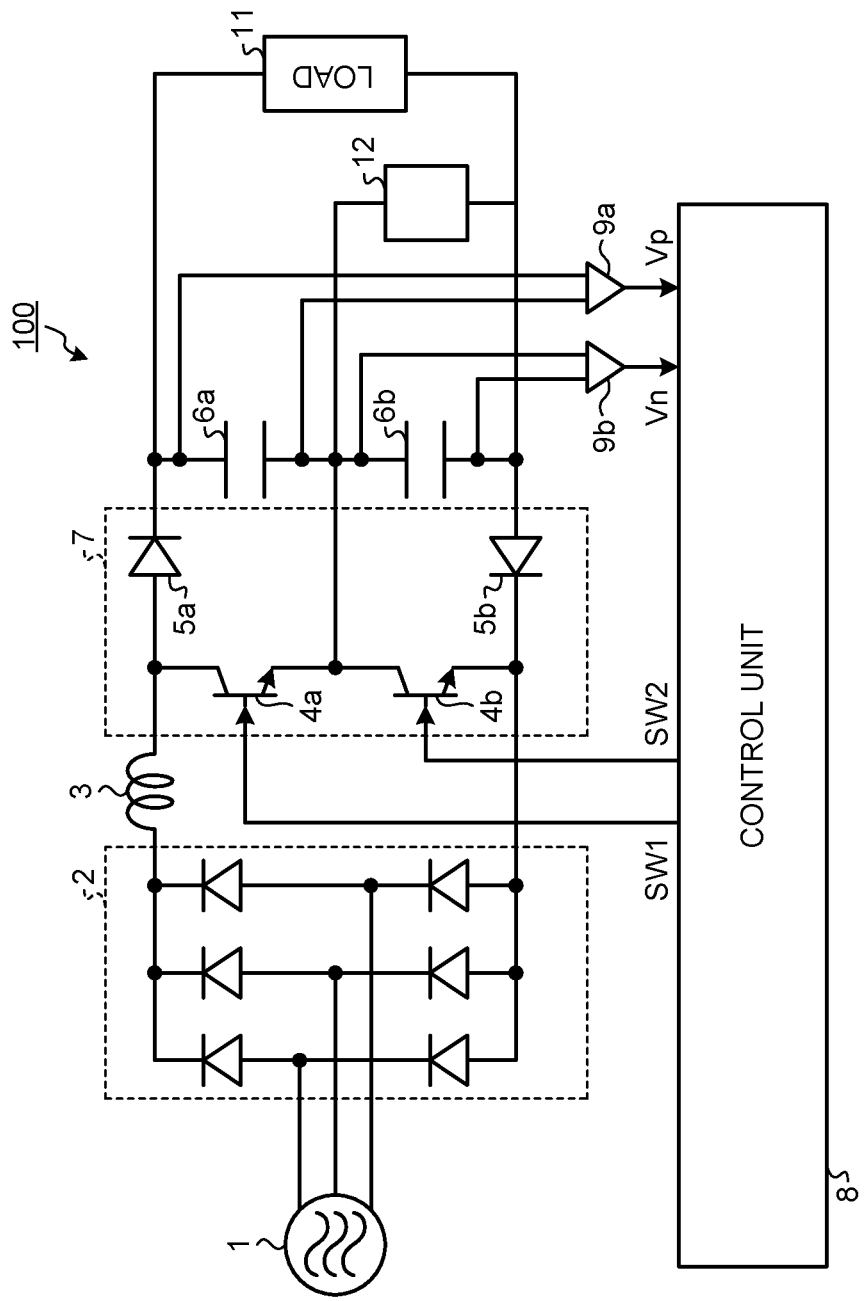
FIG. 12 is a diagram illustrating a configuration example in which a load is connected in parallel with a second capacitor, in addition to a configuration illustrated in FIG. 1.

FIG. 12 is a diagram illustrating a configuration example in which a load is connected in parallel with a second capacitor, in addition to the configuration illustrated in FIG. 1. As illustrated in FIG. 12, by connecting a load 12 having an operating voltage lower than that of the load 11 in parallel with the second capacitor 6b, a configuration of using a low withstand voltage component is possible, thereby enabling to contribute to cost reduction. In such a case, that is, when the load 12 is connected in parallel with the second capacitor 6b, an electric charge discharged from the second capacitor 6b increases, which causes voltage unbalance between the first capacitor 6a and the second capacitor 6b. However, by executing the voltage unbalance suppression control described above, the voltage unbalance between the first capacitor 6a and the second capacitor 6b can be suppressed. Further, the same holds true when there is a voltage unbalance factor between the first capacitor 6a and the second capacitor 6b such as a case in which a load is connected to one phase of the three-phase alternating current of the AC power supply 1.

In the example illustrated in FIG. 1, an example in which the voltage Vp of the first capacitor 6a and the voltage Vn of the second capacitor 6b are respectively detected has been described. However, because the voltage Vp of the first capacitor 6a and the voltage Vn of the second capacitor 6b have a different reference potential, the voltage cannot be detected on the basis of the same reference potential. Therefore, the voltage needs to be detected by using a differential circuit or the like, and thus cost increase cannot be avoided.

Figure 13:
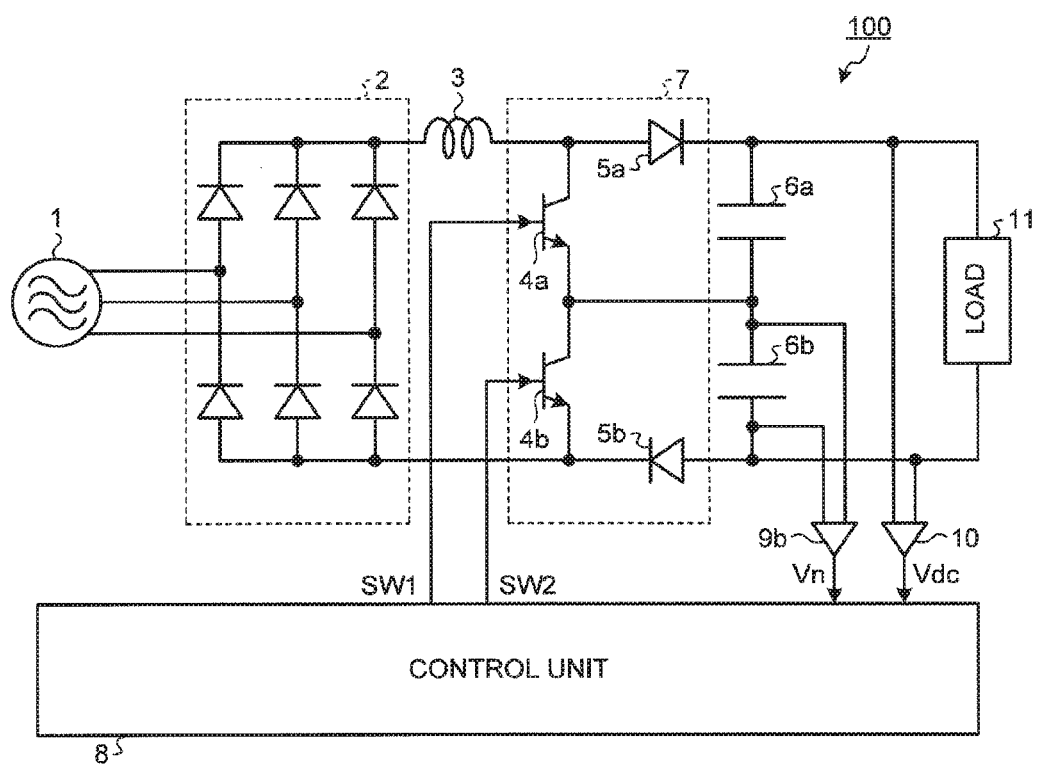
FIG. 13 is a diagram illustrating a configuration example different from the DC power-supply device according to the first embodiment illustrated in FIG. 1.

FIG. 13 is a diagram illustrating a configuration example different from the DC power-supply device according to the first embodiment illustrated in FIG. 1. As illustrated in FIG. 13, such a configuration is possible that a bus-voltage detection unit 10 that detects the DC bus voltage Vdc is provided instead of the first voltage detection unit 9a that detects the voltage Vp of the first capacitor 6a illustrated in FIG. 1. In this case, the DC bus voltage Vdc and the voltage Vn of the second capacitor 6b can be detected on the basis of the same reference potential by using a voltage dividing resistor or the like, thereby enabling to contribute to cost reduction. In this case, it will be sufficient if the voltage Vp of the first capacitor 6a is obtained by subtracting the voltage Vn of the second capacitor 6b from the DC bus voltage Vdc (Vp=Vdc−Vn), and the DC bus voltage Vdc that is a detection value of the bus-voltage detection unit 10 is input to the amplifier 82. Further, although not illustrated, it is needless to mention that a configuration in which the first voltage detection unit 9a, the second voltage detection unit 9b, and the bus-voltage detection unit 10 are equipped is also possible. In this case, it will be sufficient if the DC bus voltage Vdc that is the detection value of the bus-voltage detection unit 10 is input to the amplifier 82.

In the present embodiment, an example in which the voltage unbalance suppression control is executed by controlling the charging period or the charging phase of the first capacitor 6a and the second capacitor 6b has been described. However, the method of executing the voltage unbalance suppression control is not limited thereto, and needless to mention, it is only necessary that the method can capture the voltage Vp of the first capacitor 6a and the voltage Vn of the second capacitor 6b at least in synchronization with the voltage phase of the AC power supply 1, so as to suppress voltage unbalance between the first capacitor 6a and the second capacitor 6b.

As described above, according to the DC power-supply device of the first embodiment, in the configuration in which a rectifier circuit that rectifies three-phase alternating current, a reactor connected to the input side or the output side of the rectifier circuit, the first capacitor and a second capacitor serially connected between output terminals to the load, a charging unit that selectively charges one or both of the first capacitor and the second capacitor, and a control unit that controls the charging unit are provided, thereby converting the three-phase alternating current into a direct current and supplying the direct current to the load, the voltage Vp of the first capacitor and the voltage Vn of the second capacitor are captured at least in synchronization with the voltage phase of the alternating current, to suppress the voltage unbalance between the first capacitor and the second capacitor by using the method of controlling the charging period or the charging phase of the first capacitor and the second capacitor. Consequently, stable drive of the load and long life of the capacitor can be achieved, thereby contributing to high reliability.

More specifically, the charging unit is configured by the first switching element that switches charging and non-charging of the first capacitor, the second switching element that switches charging and non-charging of the second capacitor, the first backflow prevention element that prevents backflow of the charged electric charge of the first capacitor to the first switching element, and the second backflow prevention element that prevents backflow of the charged electric charge of the second capacitor to the second switching element, so as to control the on-duty ratio or the on-timing of the first switching element and the second switching element.

Furthermore, when the three-phase alternating current is supplied from the AC power supply, by executing control such that charging frequency of the first capacitor and the second capacitor becomes 3n times the frequency of the three-phase alternating current (n is a natural number), switching of the first switching element and the second switching element is performed in the same phase of respective phases of the three-phase alternating current, while being shifted by 120 degrees with respect to the power supply cycle. Therefore, even in the boost mode b in which there is a simultaneous off-period of the first switching element and the second switching element, or in the boost mode c in which there is a simultaneous on-period of the first switching element and the second switching element, the waveforms of the respective phase currents of the three-phase alternating current are similar to each other. Accordingly, unbalance between the respective phase currents does not occur, and thus the distortion rate of the respective phase currents takes a minimum value, thereby enabling to improve the power factor and to suppress the harmonic current.

In this case, if n=1 is established, that is, the first switching element and the second switching element are controlled to be on alternately at a frequency three times the frequency of the three-phase alternating current, a noise generation amount can be reduced and other devices connected to the same system are less affected.

Further, for example, when the DC power-supply device according to the first embodiment is applied to a plurality of types of three-phase alternating current, it will be sufficient if the switching frequency is set to be 3m times (m is a natural number) the least common multiple of the frequency of respective phases of the three-phase alternating current. For example, when the DC power-supply device is applied to 50-Hz and 60-Hz three-phase alternating currents, operations thereof can be handled if the switching frequency is set to be 3m times of 300 hertz, which is the least common multiple of 50 hertz and 60 hertz.

Second Embodiment

In the first embodiment, a configuration in which the three-phase alternating current is converted into a direct current and is supplied to a load has been described. In a second embodiment of the present invention, a configuration in which a single-phase alternating current is converted into a direct current and is supplied to a load is described.

Figure 14:
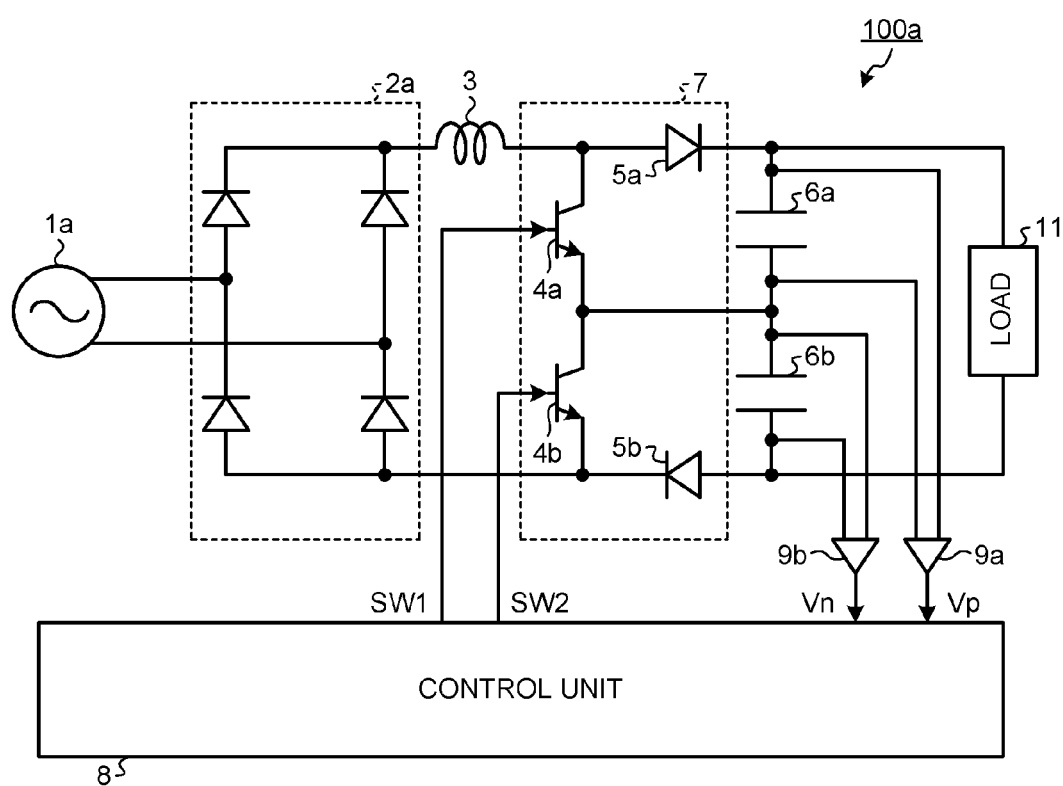
FIG. 14 is a diagram illustrating a configuration example of a DC power-supply device according to a second embodiment.

FIG. 14 is a diagram illustrating a configuration example of a DC power-supply device according to the second embodiment. As illustrated in FIG. 14, a DC power-supply device 100a according to the second embodiment has a configuration in which a single-phase alternating current supplied from an AC power supply 1a is converted into a direct current and is supplied to the load 11. In the configuration illustrated in FIG. 14, a rectifier circuit 2a is configured as a single-phase full-wave rectifier circuit in which four rectifier diodes are full-bridge connected. Further, in the example illustrated in FIG. 14, an example in which the reactor 3 is connected to an output side of the rectifier circuit 2a is illustrated. However, the reactor 3 can be connected to an input side of the rectifier circuit 2a. The configuration of a control unit 8 of the DC power-supply device 100a according to the second embodiment is the same as that of the control unit according to the first embodiment, and thus descriptions thereof are omitted here.

Also in the present embodiment, as in the first embodiment, as the operating modes of the DC power-supply device 100a according to the second embodiment, there are a full-wave rectifier mode in which the first switching element 4a and the second switching element 4b are always in an off-controlled state, and a boost mode in which the first switching element 4a and the second switching element 4b are alternately controlled to be on. As the boost mode, there are the boost mode a (the double voltage mode) in which an on-duty ratio of the first switching element 4a and the second switching element 4b is 50%, the boost mode b in which the on-duty ratio of the first switching element 4a and the second switching element 4b is less than 50%, and the boost mode c in which the on-duty ratio of the first switching element 4a and the second switching element 4b is larger than 50%. The respective operating modes are the same as the configuration in which the three-phase alternating current is converted into a direct current and is supplied to the load, which has been described in the first embodiment, and thus descriptions thereof are omitted.

Figure 15:
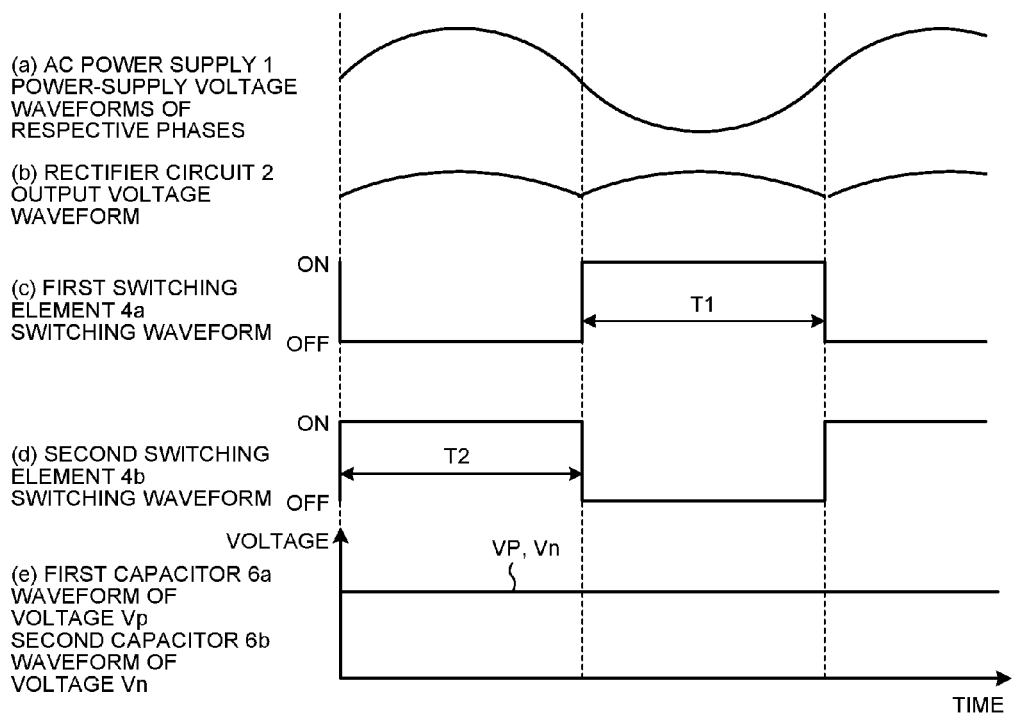
FIG. 15 is a diagram illustrating an example in which a switching operation is performed at a correct timing in a boost mode a (a double voltage mode) of the DC power-supply device according to the second embodiment.
Figure 16:
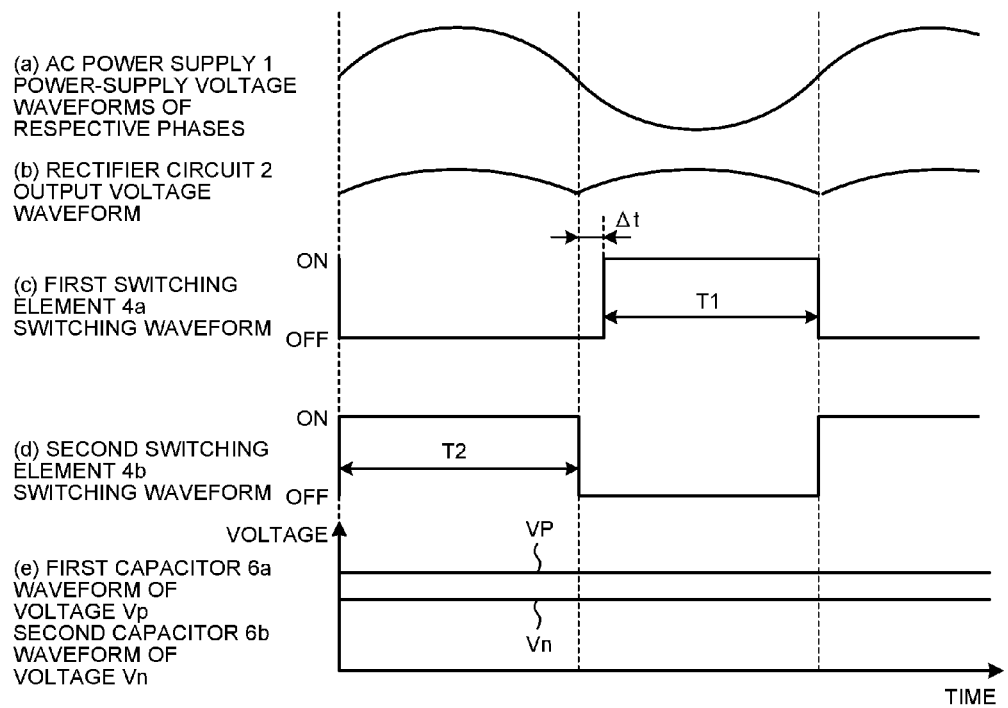
FIG. 16 is a diagram illustrating an example in which an on-timing of a first switching element is delayed in the boost mode a (the double voltage mode) of the DC power-supply device according to the second embodiment.

FIG. 15 is a diagram illustrating an example in which a switching operation is performed at a correct timing in the boost mode a (the double voltage mode) of the DC power-supply device according to the second embodiment. FIG. 16 is a diagram illustrating an example in which an on-timing of the first switching element is delayed in the boost mode a (the double voltage mode) of the DC power-supply device according to the second embodiment.

In examples illustrated in FIGS. 15 and 16, an example in which the first switching element 4a and the second switching element 4b are alternately controlled to be on at a frequency of the single-phase alternating current is illustrated. FIGS. 15(a) and 16(a) respectively illustrate a power-supply voltage waveform of the respective phases. FIGS.

15(b) and 16(b) respectively illustrate an output voltage waveform of the rectifier circuit 2a. FIGS. 15(c) and 16(c) respectively illustrate a switching waveform of the first switching element 4a. FIGS. 15(d) and 16(d) respectively illustrate a switching waveform of the second switching element 4b. FIGS. 15(e) and 16(e) respectively illustrate a waveform of the voltage Vp of the first capacitor 6a and a waveform of the voltage Vn of the second capacitor 6b.

In FIGS. 15 and 16, the on-period T1 of the first switching element 4a is equal to the charging period of the second capacitor 6b, and the on-period T2 of the second switching element 4b is equal to the charging period of the first capacitor 6a. As illustrated in FIG. 15, when the on-period T1 of the first switching element 4a, that is, the charging period of the second capacitor 6b is equal to the on-period T2 of the second switching element 4b, that is, the charging period of the first capacitor 6a (see FIGS. 15(c) and 15(d)), the voltage Vp of the first capacitor 6a and the voltage Vn of the second capacitor 6b become equivalent (see FIG. 15(e)).

Meanwhile, as illustrated in FIG. 16, if the on-timing of the first switching element 4a is delayed by Δt due to element variation or the like, and the on-period T1 of the first switching element 4a, that is, the charging period of the second capacitor 6b becomes shorter than the on-period T2 of the second switching element 4b, that is, the charging period of the first capacitor 6a (T1=T2−Δt<T2, see FIGS. 16(c) and 16(d)), the voltage Vp of the first capacitor 6a becomes higher than the voltage Vn of the second capacitor 6b, and the voltage Vp of the first capacitor 6a and the voltage Vn of the second capacitor 6b are unbalanced (Vp>Vn, see FIG. 16(e)). In this case, if the operation is continued in the boost mode a, that is, in the double voltage mode, the voltage (here, Vp) of one capacitor (here, the first capacitor 6a) becomes high, and the lifetime of the capacitor (here, the first capacitor 6a) becomes short, or a voltage exceeding a device withstand voltage may be applied. Therefore, the voltage unbalance suppression control needs to be executed as in the first embodiment, also in the configuration in which the single-phase alternating current is converted into a direct current and is supplied to the load.

When the AC power supply 1a is the single-phase AC power supply as illustrated in FIG. 14, as illustrated in FIG. 15(b) and FIG. 16(b), an output voltage of the rectifier circuit 2a becomes a direct current voltage that pulses at a frequency twice the frequency of the single-phase alternating current (see FIGS. 15(b) and 16(b)). That is, in order to execute the stable voltage unbalance suppression control, as in the first embodiment, it is required to execute the control by detecting the voltage Vp of the first capacitor 6a and the voltage Vn of the second capacitor 6b, at least in synchronization with the voltage phase of the AC power supply 1a. More preferably, it will be sufficient if the voltage Vp of the first capacitor 6a and the voltage Vn of the second capacitor 6b are detected, in synchronization with the output voltage of the rectifier circuit 2a that pulses at a frequency twice the frequency of the single-phase alternating current. In this manner, also in the configuration in which the single-phase alternating current is converted into a direct current and is supplied to the load, it will be sufficient if the voltage unbalance suppression control is executed at least in synchronization with the voltage phase of the AC power supply 1a, more preferably, with the output voltage of the rectifier circuit 2a.

As described above, according to the DC power-supply device of the second embodiment, even in the configuration in which the single-phase alternating current is converted into a direct current and is supplied to the load, the voltage Vp of the first capacitor and the voltage Vn of the second capacitor are captured at least in synchronization with the voltage phase of the AC power supply, so as to suppress voltage unbalance between the first capacitor and the second capacitor, by using the method of controlling the charging period or the charging phase of the first capacitor and the second capacitor. Consequently, stable drive of the load and long life of the capacitor can be achieved, thereby contributing to high reliability.

Third Embodiment

In a third embodiment of the present invention, a refrigeration-cycle application device to which the DC power-supply device 100 described in the first embodiment is applied is described.

Figure 17:
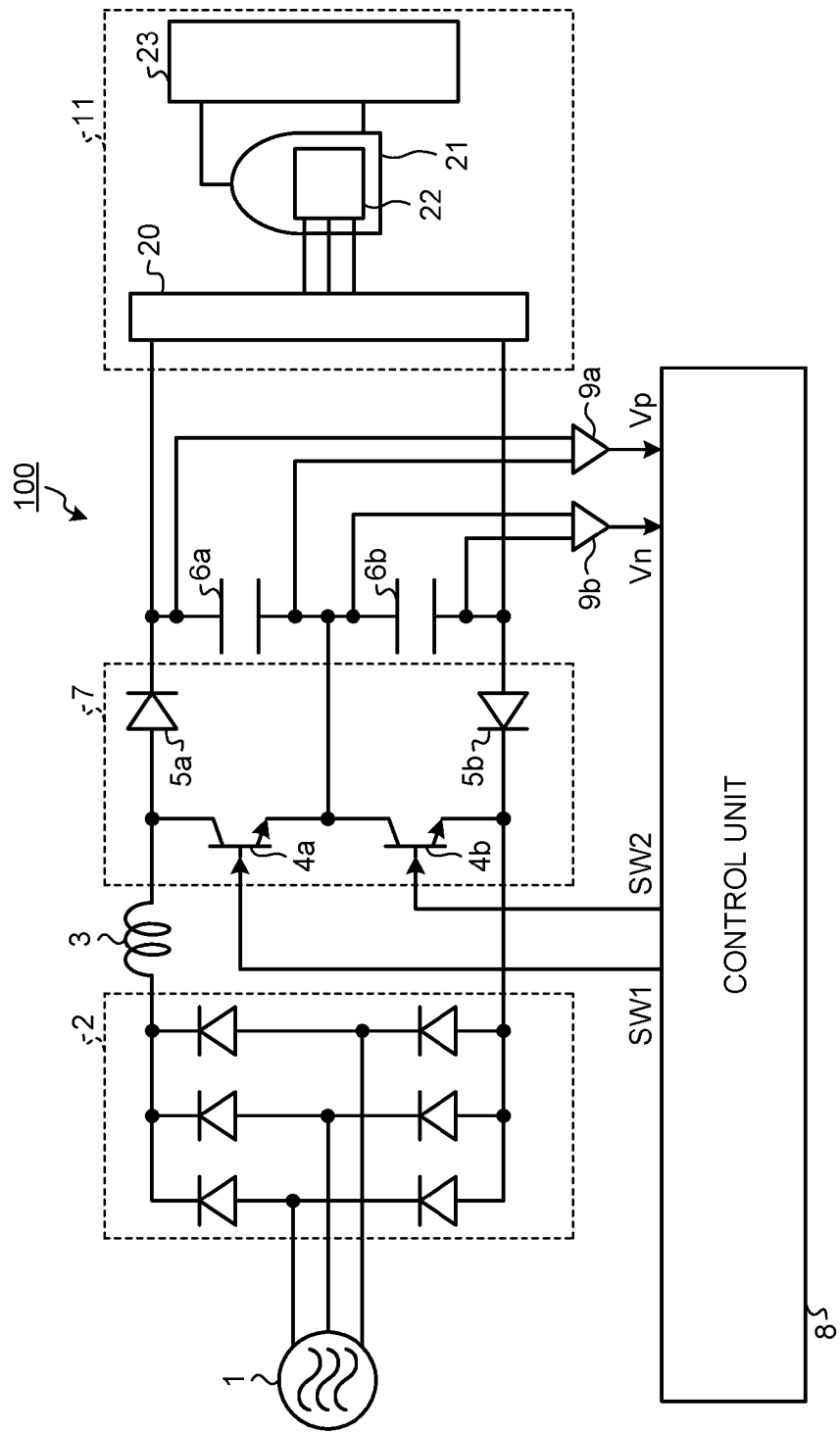
FIG. 17 is a diagram illustrating a configuration example of a refrigeration-cycle application device according to a third embodiment.

A more specific configuration of the refrigeration-cycle application device according to the third embodiment is described here with reference to FIG. 17.

FIG. 17 is a diagram illustrating a configuration example of the refrigeration-cycle application device according to the third embodiment. As the refrigeration-cycle application device according to the third embodiment, for example, an air conditioner, a heat-pump water heater, a refrigerator, a freezer, or the like is assumed. In the example illustrated in FIG. 17, a configuration example in which a refrigeration and air-conditioning device configured to include an inverter 20, a compressor 21, a motor 22, and a refrigeration cycle 23 is connected thereto as the load 11 of the DC power-supply device 100 described with reference to FIG. 1 in the first embodiment is illustrated.

The inverter 20 is operated by the DC bus voltage Vdc supplied from the DC power-supply device 100, and drives the motor 22 incorporated in the compressor 21 at a variable speed and a variable voltage to compress a refrigerant in the refrigeration cycle 23 by using the compressor 21 so as to operate the refrigeration cycle 23, thereby performing a desired operation such as cooling and heating.

In the refrigeration-cycle application device configured as illustrated in FIG. 17, effects acquired by the DC power-supply device 100 described in the first embodiment described above can be achieved.

That is, in any operating mode of the full-wave rectifier mode, the boost mode a (the double voltage mode), the boost mode b, and the boost mode c, voltage unbalance between the first capacitor 6a and the second capacitor 6b is suppressed by the voltage unbalance suppression control described in the first embodiment.

Furthermore, the effect of the refrigeration-cycle application device according to the present embodiment, to which the DC power-supply device 100 according to the first embodiment is applied, can be beyond the effect described above.

Figure 18:
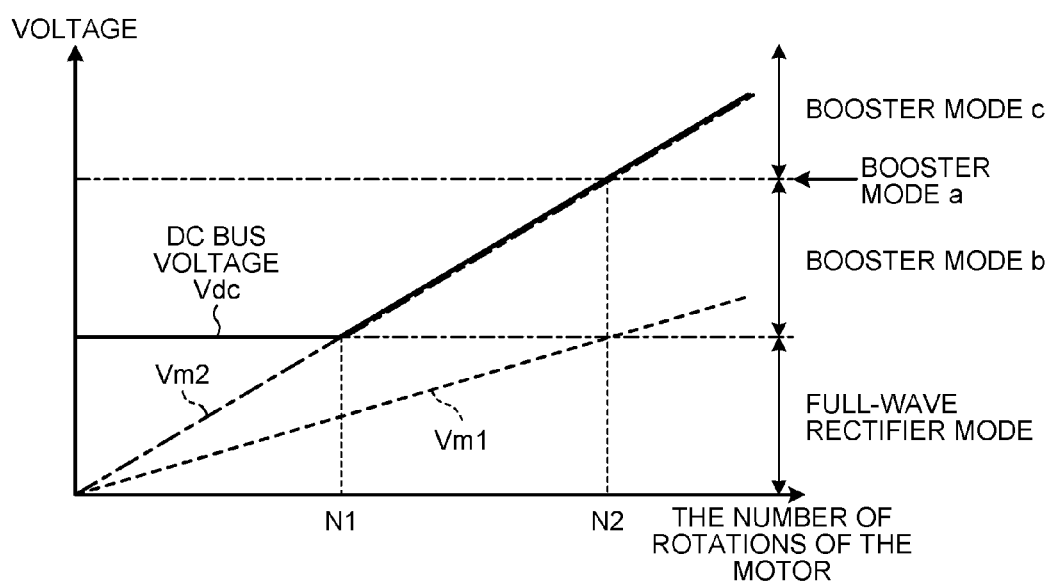
FIG. 18 is a diagram representing a relation between the number of rotations of a motor and a DC bus voltage Vdc in the refrigeration-cycle application device according to the third embodiment.

FIG. 18 is a diagram representing a relation between the number of rotations of a motor and the DC bus voltage Vdc in the refrigeration-cycle application device according to the third embodiment. Generally, if the difference between the temperature of the refrigeration and air-conditioning device and a target temperature is large, the refrigeration and air-conditioning device is operated so as to improve the capacity and approximate the temperature to the target temperature quickly. At this time, the inverter 20 increases the number of rotations of the motor 22 to increase an amount of refrigerant to be compressed by the compressor 21, thereby improving the capacity. A voltage value required for driving the motor 22 increases in proportion to the number of rotations of the motor 22 as illustrated in FIG. 18. In the case of a motor having a low induced voltage, the motor exhibits a characteristic represented by Vm1 (a broken line illustrated in FIG. 18), and in the case of a motor having a high induced voltage, the motor exhibits a characteristic represented by Vm2 (a one-dot-chain line illustrated in FIG. 18). When the motor having a high induced voltage is used, the motor can be driven with less electric current by an increased amount of the voltage supplied from the inverter 20. Therefore, the loss of the inverter 20 decreases, thereby enabling a highly efficient operation. However, if the DC power-supply device is operated in the full-wave rectifier mode, because the DC bus voltage Vdc is low, N1 becomes the upper limit of the maximum number of rotations with which a highly efficient operation can be performed, and with the number of rotations exceeding N1, an operation is possible by using flux weakening control. However, efficiency deteriorates due to an increase in the electric current.

In the DC power-supply device 100 described in the first embodiment, the DC bus voltage Vdc can be boosted by switching the operating modes according to an increase in the number of rotations of the motor 22, such that the full-wave rectifier mode is used in a region in which the number of rotations is up to N1, the boost mode b is used in a region from the number of rotations N1 to the number of rotations N2, the boost mode a (the double voltage mode) is used in a region of the number of rotations N2, and the boost mode c is used in a region in which the number of rotations is more than the number of rotations N2. Accordingly, the motor 22 can be driven highly efficiently at a high speed. Further, in the region exceeding the number of rotations N1, the inverter 20 is operated in a state in which a modulation factor is high by operating the inverter 20 at Vm2≅Vdc. Therefore, because the number of switching pulses due to PWM decreases, high efficiency can be achieved by reduction of the switching loss of the inverter 20 and reduction of high-frequency iron loss of the motor 22. Further, by operating the DC power-supply device in the boost mode c, a voltage higher than that of the boost mode a (the double voltage mode) can be output. Accordingly, high efficiency can be achieved by an increase in an induced voltage by increasing the number of turns in a coil of the motor 22.

In recent years, studies of transition from a motor using a rare-earth magnet, which is expensive and whose stable supply is difficult, such as neodymium (Nd) and dysprosium (Dy) to a motor without using the rare-earth magnet are progressing, but there are problems concerning a decrease in efficiency and a decrease in demagnetization durability. In the DC power-supply device 100 described in the first embodiment, as described above, a decrease in efficiency can be compensated by increasing the number of turns by means of boosting. Regarding the decrease in demagnetization durability, the flux weakening control can be suppressed by boosting, and thus an inexpensive motor that can be supplied stably can be used.

Furthermore, as a power-supply voltage of the AC power supply 1, which is a power supply of the DC power-supply device 100, there are various supply voltages such as 200 volts and 400 volts. Therefore, if the motor 22 is designed in accordance with respective power supply conditions for each delivery destination, a plurality of types of motor specification are required, thereby increasing the evaluation load and the development load of the motor 22. In the DC power-supply device 100 described in the first embodiment, for example, when the supply voltage of the AC power supply 1 is 200 volts, the DC power-supply device is operated in the boost mode a (the double voltage mode), and when the supply voltage of the AC power supply 1 is 400 volts, the DC power-supply device is operated in the full-wave rectifier mode, thereby equalizing the DC bus voltage Vdc in the case where the supply voltage of the AC power supply 1 is 200 volts and in the case where the supply voltage of the AC power supply 1 is 400 volts. Consequently, the DC power-supply device can be driven with the same motor specification. Further, even in the case where the supply voltage of the AC power supply 1 is 400 volts, when the DC power-supply device is operated in the full-wave rectifier mode, if the supply voltage is varied, the DC bus voltage Vdc is also varied. However, for example, if the DC bus voltage Vdc becomes lower than an assumed value when the DC power-supply device is operated in the full-wave rectifier mode, the DC bus voltage Vdc is boosted by using the boost mode b, thereby enabling to reduce the influence due to the fluctuation of the power-supply voltage, and the inverter 20 can be operated with a fixed voltage.

Furthermore, when the AC power supply 1 is a three-phase AC power supply, in each boost mode, by alternately controlling the first switching element and the second switching element to be on at a frequency 3n times the frequency of the three-phase alternating current acquired from a detection result of the power-supply voltage detection unit, the waveforms of the respective phase currents of the three-phase alternating current are similar to each other. Accordingly, unbalance between the respective phase currents does not occur, and thus the distortion rate of the respective phase currents takes a minimum value, thereby enabling to improve the power factor and to suppress the harmonic current.

As described above, according to the refrigeration-cycle application device of the third embodiment, by configuring the refrigeration-cycle application device by using the DC power-supply device according to the first embodiment described above, the effects acquired by the DC power-supply device according to the first embodiment can be achieved.

Furthermore, by switching the full-wave rectifier mode, the boost mode b, the boost mode a (the double voltage mode), and the boost mode c according to an increase in the number of rotations of the motor, the motor can be driven highly efficiently at high speed.

Further, high efficiency can be achieved by an increase in an induced voltage by increasing the number of turns in a coil of the motor, thereby enabling to use an inexpensive motor that can be supplied stably.

Because it is possible to cope with different power-supply voltages without changing the motor specification, the evaluation load and the development load of the motor can be reduced.

Furthermore, when the three-phase AC power supply is to be supplied, in each boost mode, by performing switching at a frequency 3n times the frequency of the three-phase alternating current acquired from the detection result of the power-supply voltage detection unit, the waveforms of the respective phase currents of the three-phase alternating current are similar to each other. Accordingly, unbalance between the respective phase currents does not occur, and thus the distortion rate of the respective phase currents takes a minimum value, thereby enabling to improve the power factor and to suppress the harmonic current.

In the embodiments described above, it is a common procedure to use an Si semiconductor made of silicon (Si) as the switching element and the backflow prevention element as one of the constituents constituting the charging unit of the capacitor. However, a wide-bandgap (WBG) semiconductor made of silicon carbide (SiC), gallium nitride (GaN), or diamond can also be used.

The switching element and the backflow prevention element formed of a WBG semiconductor have high voltage endurance and high allowable current density. Therefore, downsizing of the switching element and the backflow prevention element is possible, and by using such downsized switching element and backflow prevention element, downsizing of a DC power-supply device configured by using these elements is made possible.

The switching element and the backflow prevention element formed of a WBG semiconductor have high heat resistance. Therefore, downsizing of heat radiating fins of a heatsink and air cooling of a water-cooled unit are possible, thereby enabling further downsizing of the DC power-supply device.

Furthermore, the switching element and the backflow prevention element formed of a WBG semiconductor have a small power loss. Therefore, the switching element and the backflow prevention element can have high efficiency, and thus the DC power-supply device can have high efficiency as well.

While it is desired that both the switching element and the backflow prevention element are formed of a WBG semiconductor, it is also possible that only one of these elements is formed of a WBG semiconductor, and even in this case, the effects described above can be achieved.

In the embodiments described above, as the switching element, for example, a power transistor, a power MOSFET, and an IGBT have been mentioned as examples. However, identical effects can be acquired by using a MOSFET (Metal-Oxide-Semiconductor Field-Effect Transistor) having a super junction structure, known as a highly efficient switching element, an insulated gate semiconductor device, a bipolar transistor, or the like.

Furthermore, while the control unit can be configured by a CPU (Central Processing Unit), a DSP (Digital Signal Processor), or a discrete system of a microcomputer, other than those units, the control unit can be also configured by an electrical circuit element such as an analog circuit or a digital circuit.

The configurations described in the above embodiments are only examples of the contents of the present invention. These embodiments can be combined with other well-known techniques, and it is needless to mention that the present invention can be configured while modifying it without departing from the scope of the invention, such as omitting a part of constituent elements in these embodiments.

INDUSTRIAL APPLICABILITY

As described above, the present invention is useful as a technique of suppressing voltage unbalance between a plurality of capacitors in a DC power-supply device having a configuration in which the capacitors are serially connected between both terminals of a load, and power is supplied by charging these capacitors. The present invention is particularly suitable for a DC power-supply device having a configuration in which an alternating current is converted into a direct current and is supplied to a load and for a refrigeration-cycle application device including the DC power-supply device.

The invention claimed is:

1. A DC power-supply device that converts an alternating current into a direct current and supplies the direct current to a load, comprising:
   a rectifier circuit to rectify the alternating current;
   a reactor connected to an input side or an output side of the rectifier circuit;
   a first capacitor and a second capacitor serially connected between output terminals to the load;
   a charging unit to selectively charge one or both of the first capacitor and the second capacitor;
   a first voltage detection unit to detect a voltage of the first capacitor;
   a second voltage detection unit to detect a voltage of the second capacitor; and
   a control unit to control the charging unit, wherein:
   the control unit controls at least one of a charging period of the first capacitor and a charging period of the second capacitor,
   by changing at least of one of the charging period of the first capacitor and the charging period of the second capacitor with respect to a voltage difference between the first capacitor and the second capacitor at a first time, a voltage difference between the first capacitor and the second capacitor at a second time, which is after the first time, is made small,
   the alternating current is a three-phase alternating current,
   the control unit controls the charging unit in such a manner that, when a period obtained by combining a charging period and a non-charging period of a pair of the first capacitor and the second capacitor is designated as one cycle, a charging frequency becomes 3n times (n is a natural number) higher than a frequency of the three-phase alternating current, and
   the charging frequency is an inverse number of the one cycle.

2. The DC power-supply device according to claim 1, wherein
   the control unit controls charging periods of the first capacitor and the second capacitor respectively to suppress voltage unbalance between the first capacitor and the second capacitor.

3. The DC power-supply device according to claim 1, wherein
   the control unit respectively controls charging phases of the first capacitor and the second capacitor to suppress voltage unbalance between the first capacitor and the second capacitor.

4. The DC power-supply device according to claim 1, wherein
   the control unit detects voltage zero crossing of the alternating current to capture the voltage of the first capacitor and the voltage of the second capacitor.

5. The DC power-supply device according to claim 1, wherein
   the charging unit includes:
      a first switching element that switches charging and non-charging of the first capacitor,
      a second switching element that switches charging and non-charging of the second capacitor,
      a first backflow prevention element that prevents backflow of a charged electric charge of the first capacitor to the first switching element, and
      a second backflow prevention element that prevents backflow of a charged electric charge of the second capacitor to the second switching element.

6. The DC power-supply device according to claim 5, wherein
   the control unit respectively changes an on-duty ratio of the first switching element and the second switching element to suppress voltage unbalance between the first capacitor and the second capacitor.

7. The DC power-supply device according to claim 5, wherein
the control unit respectively changes an on-timing of the first switching element and the second switching element to suppress voltage unbalance between the first capacitor and the second capacitor.

8. The DC power-supply device according to claim 5, wherein
the control unit has:
a full-wave rectifier mode in which the first switching element and the second switching element are in an off-controlled state, and
a boost mode in which the first switching element and the second switching element are alternately controlled to be on.

9. The DC power-supply device according to claim 5, wherein
at least one of the first switching element, the second switching element, the first backflow prevention element, and the second backflow prevention element is formed of a wide-bandgap semiconductor.

10. The DC power-supply device according to claim 9, wherein
the wide-bandgap semiconductor is made of silicon carbide, a gallium nitride material, or diamond.

11. The DC power-supply device according to claim 1, wherein
the control unit controls the charging unit such that the charging frequency becomes 3m times (m is a natural number) higher than a least common multiple of the frequency of a plurality of types of the three-phase alternating current, in accordance with the frequency of the plurality of types of the three-phase alternating current.

12. A refrigeration-cycle application device comprising the DC power-supply device according to claim 1.

13. The refrigeration-cycle application device according to claim 12 comprising, as the load, an inverter to drive a motor.

* * * * *